United States Patent
Baykal et al.

(10) Patent No.: US 9,787,492 B2
(45) Date of Patent: *Oct. 10, 2017

(54) PROVISIONING NETWORK DEVICES IN ETHERNET-BASED ACCESS NETWORKS

(71) Applicant: Calix, Inc., Petaluma, CA (US)

(72) Inventors: Berkay Baykal, Newton, MA (US); Shaun Noel Missett, Avon, CT (US)

(73) Assignee: Calix, Inc., Petaluma, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/687,495

(22) Filed: Apr. 15, 2015

(65) Prior Publication Data

US 2015/0244540 A1    Aug. 27, 2015

Related U.S. Application Data

(63) Continuation of application No. 13/093,371, filed on Apr. 25, 2011, now Pat. No. 9,025,951.

(60) Provisional application No. 61/394,292, filed on Oct. 18, 2010.

(51) Int. Cl.
*H04L 12/28* (2006.01)
*H04L 29/06* (2006.01)

(52) U.S. Cl.
CPC ...... *H04L 12/2898* (2013.01); *H04L 12/2881* (2013.01); *H04L 12/2885* (2013.01); *H04L 63/08* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 9,025,951 B2 | 5/2015 | Baykal et al. | |
| 2004/0098588 A1* | 5/2004 | Ohba | H04L 63/08 713/169 |
| 2007/0025306 A1* | 2/2007 | Cox | H04L 41/0806 370/338 |
| 2007/0044141 A1* | 2/2007 | Lor | H04L 63/0236 726/3 |

(Continued)

OTHER PUBLICATIONS

Yaakov (Jonathan) Stein, Ethernet OAM, White Paper, RAD Data Communications, Mar. 2006, 20 pp.

(Continued)

*Primary Examiner* — Huy D Vu
*Assistant Examiner* — Bao G Nguyen
(74) *Attorney, Agent, or Firm* — Shumaker & Sieffert, P.A.

(57) ABSTRACT

In general, techniques are described for provisioning network devices in an Ethernet-based access network. For example, an access node located in an Ethernet-based access network positioned intermediate to a back office network and a customer network may implement the techniques. The access node comprises a control unit that discovers a demarcation point device that terminates the access network of the service provider network at the customer network. The control unit of the access node implements an Ethernet protocol to provide layer two network connectivity between the service provider network and the customer network, authenticates the demarcation point device based on a unique identifier assigned to the demarcation point device and, after successfully authenticating the demarcation point device, provisions the demarcation point device.

20 Claims, 10 Drawing Sheets

(56) References Cited

U.S. PATENT DOCUMENTS

| | | | |
|---|---|---|---|
| 2007/0274722 A1* | 11/2007 | Zhao | H04L 41/0853 398/71 |
| 2009/0049532 A1 | 2/2009 | Gao et al. | |
| 2009/0317073 A1 | 12/2009 | Hotchkiss et al. | |
| 2010/0281518 A1 | 11/2010 | Bugenhagen | |
| 2011/0158112 A1 | 6/2011 | Finn et al. | |
| 2011/0158208 A1* | 6/2011 | Solanki | H04L 12/185 370/338 |
| 2013/0177309 A1 | 7/2013 | El-Ahmadi et al. | |

OTHER PUBLICATIONS

IEEE Standard 802.3-2008, Part 3: Carrier Sense Multiple Access with Collision Detection (CSMA/CD) access method and Physical Layer specifications, Copyright 2008, Third Printing, Jun. 2010, 615 pp.

Case, et al., "A Simple Network Management Protocol (SNMP)," RFC 1157, Network Working Group, May 1990, 37 pp.

Droms, "Dynamic Host Configuration Protocol," RFC 2131, Network Working Group, Mar. 1997, 46 pp.

Rigney, Remote Authentication Dial in User Service (RADIUS), RFC 2865, Network Working Group, Jun. 2000, 69 pp.

Prosecution History from U.S. Appl. No. 13/093,371, from Apr. 24, 2014 through Jan. 6, 2015, 50 pp.

* cited by examiner

PROVISIONING NETWORK DEVICES IN ETHERNET-BASED ACCESS NETWORKS

This application is a continuation of U.S. application Ser. No. 13/093,371, filed Apr. 25, 2011, which claims the benefit of U.S. Provisional Application No. 61/394,292, filed Oct. 18, 2010, the entire contents of each of which is incorporated herein by reference.

TECHNICAL FIELD

This disclosure relates to computer networks and, more particularly, to provisioning network devices in computer networks.

BACKGROUND

A service provider (SP) network typically comprises a number of different types of computer networks interconnected to one another. One type of network, referred to as an access network enables so-called "customer premises equipment" or "CPE" (which may also be referred to as "subscriber devices") to access the service provider network, which often connects to a large number of public networks generally referred to collectively as the "Internet." CPE may include Internet-ready televisions, non-Internet-ready televisions, set-top boxes (STBs), gaming consoles, personal media players, digital video disc (DVD) players, Blu-ray players, desktop computers, laptop computers, slate or tablet computers, wireless telephones (including so-called "smart phones"), global positioning system (GPS) devices, wireless access points (WAPs), switches, hubs, printers, servers, and any other similar devices commonly employed by customers to access one or more of the services provided by service provider network.

Recently, service providers have begun upgrading access networks to support a layer two (L2) protocol referred to as Ethernet, where reference to layers followed by a number refers to an indicated layer of an Open Systems Interconnection (OSI) model. Prior to this upgrade, access networks provided access through a passive optical network (PON) infrastructure, such as a gigabyte PON (GPON) infrastructure, a digital subscriber line (DSL) infrastructure or a data over cable service interface specification (DOCSIS) compliant infrastructure. In deploying this form of Ethernet-based access network, so-called "demarcation point devices" or "DPDs" are provided to each customer network connected to the service provider network so as to transition the connection from, for example, a fiber link in the instance of an active Ethernet (AE) optical network to a copper line and/or coaxial cables prevalent in most customer networks. These DPDs couple to an Ethernet aggregation device, such as an Ethernet switch, that is also located at the customer network. The Ethernet switch aggregates Ethernet traffic from multiple sources and outputs upstream (i.e., from the customer networks to the SP network) traffic from the DPDs for delivery upstream to a router located in the access network.

There are generally two different types of DPDs. A first type of DPD comprises a device that does not require any management or provisioning and which provides basic services in terms of converting traffic for delivery via a first physical medium (e.g., a fiber link) to a second physical medium (e.g., copper line) and via the second physical medium to the first physical medium. This first type of DPD may be referred to as a "basic" DPD in that it does not require active management or provisioning. This basic DPD is commonly paired with an Ethernet switch that has been adapted or enhanced to provide access functionality. The second type of DPD comprises a device that has been specifically designed to provide Ethernet access, which may be referred to as an "advanced" DPD in that this DPD is more advanced in terms of its capabilities with regard to Ethernet access. The advanced DPDs may be provisioned remotely via a management device or provisioning system. The advanced DPDs are generally paired with a more basic Ethernet aggregation device. Typically, the basic DPD/ enhanced Ethernet aggregation device pairing is difficult to provision remotely via a back office provisioning system. The basic DPD does not support this functionality (indeed, basic DPDs are generally designed such that provisioning is not required), while the enhanced Ethernet aggregation devices are typically not designed to be to be integrated with back office systems as they were not customarily used as access nodes.

SUMMARY

In general, techniques are described for providing scalable layer two (L2) provisioning of network devices located in Ethernet-based access networks. The techniques may provide this form of L2 provisioning of network devices by enabling access nodes located in the access networks to act as what may be referred to as a "provisioning bridge" or "management bridge" between more basic DPDs that do not support network-wide layer three (L3) addressability and the provisioning system located in network operation control centers back office network of a service provider network. The provisioning bridge aspects of the techniques may also facilitate interoperability between this provisioning system and the DPDs by translating between the different protocols supported by the provisioning system and the DPDs.

In this way, the techniques may provide a scalable form of L2 provisioning for network devices located in Ethernet-based access networks. The techniques may facilitate scaling in that the access node may be extended to provide a bridge between any number of DPDs (regardless of whether these DPDs are basic or advanced) and the back-office provisioning system. The techniques may overcome provisioning issues that occur as a result of the lack of remote provisioning support provided by basic DPDs while also addressing compatibility issues that occur between more advanced DPDs and the provisioning system. By implementing the techniques described in this disclosure, the access nodes may provide a form of management bridge that is capable of provisioning DPDs via any number of different provisioning schemes provided by way of the above noted interworking function such that DPDs may be provisioned by any provisioning system regardless of whether the DPDs support the same provisioning protocol as that employed by the provisioning system.

In one example, a method comprises discovering, with an access node located in an access network of a service provider network, a demarcation point device that terminates the access network of the service provider network at a customer network and transfers data between a first physical communication medium used within the access network to communicate the data and a second physical communication medium used within the customer network to communicate the data, wherein the access network implements an Ethernet protocol to provide layer two (L2) network connectivity between the service provider network and the customer network. The method further comprises authenticating, with the access node, the demarcation point device based on a unique identifier assigned to the demarcation point device and, after successfully authenticating the demarcation point device, provisioning the demarcation point device with the access node.

In another example, an access node located in an access network of a service provider network positioned intermediate to a back office network of the service provider network and a customer network may implement the techniques described in this disclosure. The access node comprises a control unit that discovers a demarcation point device that terminates the access network of the service provider network at the customer network, wherein the demarcation point device transfers data between a first physical communication medium used within the access network to communicate the data and a second physical communication medium used within the customer network to communicate the data. The control unit further implements an Ethernet protocol to provide layer two (L2) network connectivity between the service provider network and the customer network, authenticates the demarcation point device based on a unique identifier assigned to the demarcation point device and, after successfully authenticating the demarcation point device, provisions the demarcation point device.

In another example, a network system comprises a customer network and a service provider network that provides one or more services. The service provider network includes a provisioning system and an access network comprising an access node and a demarcation point device. The access network implements an Ethernet protocol to provide layer two (L2) network connectivity between the service provider network and the customer network. The demarcation point device terminates the access network of the service provider network at the customer network and transfers data between a first physical communication medium used within the access network to communicate the data and a second physical communication medium used within the customer network to communicate the data. The access node is positioned intermediate to the provisioning system and the demarcation point device. The access node includes a control unit that discovers the demarcation point device, authenticates the demarcation point device based on a unique identifier assigned to the demarcation point device and, after successfully authenticating the demarcation point device, provisions the demarcation point device.

In another example, a non-transitory computer-readable medium comprising instructions that, when executed, cause one or more processors to discover, with an access node located in an access network of a service provider network, a demarcation point device that terminates the access network of the service provider network at a customer network and transfers data between a first physical communication medium used within the access network to communicate the data and a second physical communication medium used within the customer network to communicate the data, wherein the access network implements an Ethernet protocol to provide layer two (L2) network connectivity between the service provider network and the customer network, authenticate, with the access node, the demarcation point device based on a unique identifier assigned to the demarcation point device and, after successfully authenticating the demarcation point device, provision the demarcation point device with the access node.

In another example, a method comprises receiving, with a demarcation point device, a layer three (L3) address for use in communicating within a service provider network, wherein the L3 address is unique within the service provider network, wherein the demarcation point device terminates an access network of the service provider network at a customer network and transfers data between a first physical communication medium used within the access network to communicate the data and a second physical communication medium used within the customer network to communicate the data, and wherein the access network implements an Ethernet protocol to provide layer two (L2) network connectivity between the service provider network and the customer network. The method also comprises requesting authentication with the demarcation point device directly from a provisioning system of the service provider network using L3 communications that include the L3 address and, upon being successfully authenticated in response to the authentication request, requesting configuration data with the demarcation point device directly from the provisioning system, wherein the configuration data includes first data to configure the demarcation point device and second data to configure an access node of the access network that is positioned between the demarcation point device and the provisioning system. The method further comprises provisioning one or more interfaces of the demarcation point device using the first data to provide one or more services to the customer network and transmitting to the access node the second data for configuring the demarcation point device.

In another example, a demarcation point device that terminates an access network of a service provider network at a customer network comprises one or more interfaces and a control unit that receives a layer three (L3) address for use in communicating within the service provider network, wherein the L3 address is unique within the service provider network, requests authentication directly from a back office network of the service provider network using L3 communication that includes the L3 address, upon being successfully authenticated in response to the authentication request, requests configuration data directly from the provisioning system, wherein the configuration data includes first data to configure the demarcation point device and second data to configure an access node of the access network that is positioned between the demarcation point device and the provisioning system and provisions the one or more interfaces of the demarcation point device using the first data to provide one or more services to the customer network. The one or more interfaces transmit the second data of the configuration data to the access node.

In another example, a network system comprises a customer network and a service provider network that provides one or more services. The service provider network includes a provisioning system and an access network comprising an access node and a demarcation point device. The access network implements an Ethernet protocol to provide layer two (L2) network connectivity between the service provider network and the customer network. The demarcation point device terminates the access network of the service provider network at the customer network and transfers data between a first physical communication medium used within the access network to communicate the data and a second physical communication medium used within the customer network to communicate the data. The access node is positioned intermediate to the provisioning system and the demarcation point device. The demarcation point device comprises one or more interfaces and a control unit that receives a layer three (L3) address for use in communicating within the service provider network, wherein the L3 address is unique within the service provider network, requests authentication directly from the back office network of the service provider network using L3 communications that include the L3 address, upon being successfully authenticated in response to the authentication request, requests configuration data with the demarcation point device directly from the back office network, wherein the configuration data includes first data to configure the demarcation point device and second data to configure the access node of the access network, and provisions the one or more interfaces of the demarcation point device using the first data to provide one or more services to the customer network. The one or more interfaces of the demarcation point device transmit to the access node the second data of the configuration data for configuring the demarcation point device.

In another example, a non-transitory computer readable medium comprising instructions that, when executed, cause one or more processors to receive, with a demarcation point device, a layer three (L3) address for use in communicating within a service provider network, wherein the L3 address is unique within the service provider network, wherein the demarcation point device terminates an access network of the service provider network at a customer network and transfers data between a first physical communication medium used within the access network to communicate the data and a second physical communication medium used within the customer network to communicate the data, wherein the access network implements an Ethernet protocol to provide layer two (L2) network connectivity between the service provider network and the customer network, request authentication with the demarcation point device directly from a provisioning system of the service provider network using L3 communications that include the L3 address, upon being successfully authenticated in response to the authentication request, request configuration data with the demarcation point device directly from the provisioning system, wherein the configuration data includes first data to configure the demarcation point device and second data to configure an access node of the access network that is positioned between the demarcation point device and the provisioning system, using the first data, provisions one or more interfaces of the demarcation point device to provide one or more services to the customer network and transmit the second data of the configuration data to the access node.

The details of one or more examples of the techniques are set forth in the accompanying drawings and the description below. Other features, objects, and advantages of the techniques will be apparent from the description and drawings, and from the claims.

DETAILED DESCRIPTION

Figure 1:
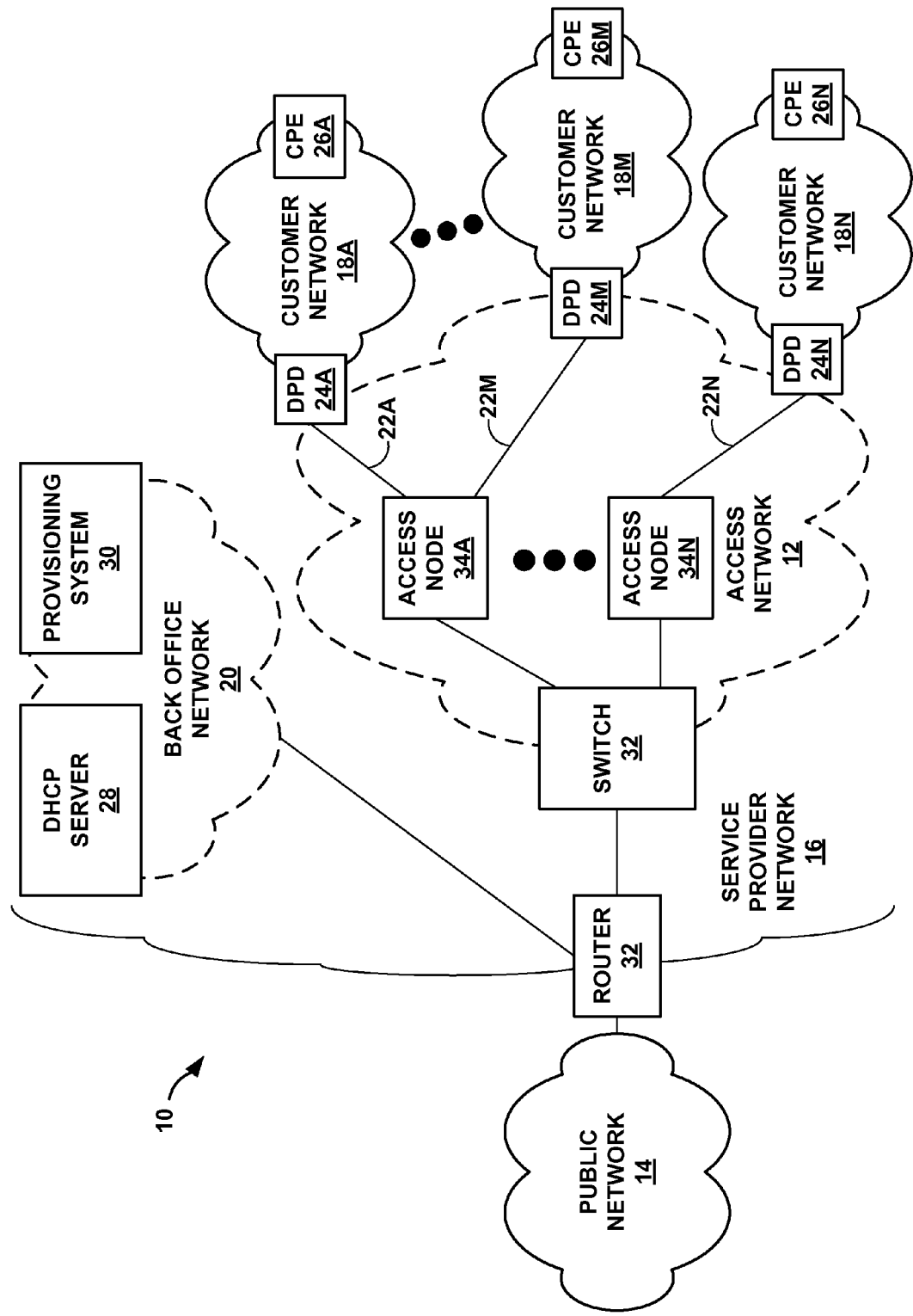
FIG. 1 is a block diagram illustrating an example network system that implements the provisioning techniques described in this disclosure to provision an Ethernet-based access network.

FIG. 1 is a block diagram illustrating an example network system 10 that implements the provisioning techniques described in this disclosure to provision an Ethernet-based access network 12. In the example of FIG. 1, network system includes a public network 14 and a service provider network 16. Public network 14 represents any type of network that is made available for general public access. Public network 14 commonly implements at least one layer three (L3) protocol (such as an Internet protocol or IP) to communicate data in the form of packets, where again reference to layers refers to layers of the Open Systems Interconnection (OSI) model. For this reason, public network 14 may be referred to as a packet-switched network. Public network 14 may generally represent what is commonly referred to as the "Internet." While shown as a single network, public network 14 may comprise one or more networks that are each interconnected to form public network 14.

Service provider network 16 may comprise one such network that is interconnected with other networks to form public network 14. Service provider network 16 is shown separately from public network 14 for purposes of illustrating the techniques described in this disclosure. While described with respect to service provider network 16, the techniques may be implemented with respect to any type of network, including private networks that do not generally permit the general public to access the private network without first authenticating themselves as a valid member of that network. In any event, service provider network 16 may represent a network that provides one or more services to subscribers or customers of service provider network 16.

Commonly, service provider network 16 offers one or more of a data or so-called "Internet" service by which these customers may interface with public network 14, a television service (such as a cable television service), and a telephone service (either by way of a plain old telephone system (POTS), which is often referred to as a "landline" service or as a Voice over IP (VoIP) service). In some instances, a service provider that owns and operates service provider network 16 may provide the infrastructure by which to provide one or more of the above noted services and one or more of the above noted services. Competing service providers may also contract with the service provider that owns and operates service provider network 16 to provide competing and additional services to those provided by the service provider that owns and operates service provider network 16. In any event, service provider network 16 may provide a collection of one or more services, which the customers may purchase typically on a monthly basis for a monthly fee.

In the example of FIG. 1, service provider network 16 includes a router 17, customer networks 18A-18N ("customer networks 18"), back office network 20 and an access network 12. Router 17 represents a network device that routes L3 packets between service provider network 16 and private network 14, as well as, between back office network 20 and access network 12. Each of customer networks 18 represents a network owned and operated by customers of service provider network 16. Typically, a customer's premises (e.g., a customer's home) provides the necessary infrastructure (such as the physical communication medium) to support each of customer networks 18.

The service provider typically runs physical communication mediums, which are shown as links 22A-22N ("links 22"), to each of customer networks 18. In the example of FIG. 1, links 22 are each assumed to represent a fiber link for purposes of illustration. The techniques however should not be limited to fiber links but may include any other type of link, including a coaxial link, a copper link or any other form of physical communication medium. In some instances, the techniques may be extended to wireless communication mediums that do not involve physical communication mediums.

Each of customer networks 18 includes a respective one of demarcation point device (DPD) 24A-24N ("DPDs 24") and a respective one of customer premises equipment (CPE) 26A-26N ("CPE 26"). Each of DPDs 24 represents a device that transfers data between a first physical communication medium used within access network 12 to communicate the data, i.e., links 22 shown in the example of FIG. 1, and a second physical communication medium used within customer networks 18 to communicate the data. In the context of transferring data between fiber links 22 and customer network physical communication mediums, DPDs 24 may each represent an optical node terminal (ONT). Other examples of DPDs 24 include cable modems, digital subscriber line (DSL) modems and the like. This second physical communication medium used within customer network 18 may comprise coaxial cable, copper telephone lines, Ethernet cable (which is typically referred to as "category 5 cable" or "cat5 cable"), or any other type of physical communication medium commonly employed in customer premises to facilitate the communication of data, such as voice data, Internet data, or video data.

CPE 26 may each represent a device employed by the customer that utilizes one or more of the services provided by service provider network 16 to which the customer subscribes. Example CPE 26 include Internet-ready televisions, non-Internet-ready televisions, set-top boxes (STBs), gaming consoles, personal media players, digital video disc (DVD) players, Blu-ray players, desktop computers, laptop computers, slate or tablet computers, wireless telephones (including so-called "smart phones"), global positioning system (GPS) devices, wireless access points (WAPs), switches, hubs, printers, servers, and any other similar devices commonly employed by customers to access one or more of the services provided by service provider network 16. Although shown as including a single one of DPDs 24 and CPE 26, each of customer networks 18 may, in some instances, include more than one of DPDs 24 and/or more than one CPE 26. The techniques should not therefore be limited in this respect to the example shown in FIG. 1.

Back office network 20 represents a sub-network within service provider network 16 responsible for managing or otherwise supporting delivery of the one or more services to customer networks 18. Back office network 20 includes a dynamic host configuration protocol (DHCP) server 28 and a provisioning system 30. DHCP server 28 represents a network device that allocates L3 addresses for use by other network devices in communicating within service provider network 16 and public network 14. In the example of FIG. 1, this network device 28 implements a particular protocol for assigning or otherwise allocating L3 addresses referred to as DHCP. While described with respect to DHCP, this network device 28 may implement other protocols by which to allocate L3 address either in conjunction with or as an alternative to DHCP.

Provisioning system 30 represents a network device that provisions or otherwise configures network devices within service provider network 16. Commonly, provisioning system 30 implements a proprietary provisioning or configuration protocol unique to the manufacturer of provisioning system 30. This proprietary provisioning protocol may comprise a standards-based provisioning protocol, such as a simple network management protocol (SNMP), that has been expanded through the use of proprietary type length values (TLVs) to become what may be referred to as a "proprietary provisioning protocol" in this disclosure.

As a result of implementing the proprietary protocol, provisioning system 30 may only, in some instances, directly interface with those network devices of service provider network 16 produced by the same manufacturer of provisioning system 30 as these devices are the only ones that typically implement the proprietary provisioning protocol. Provisioning system 30 may provide an interface with which an administrator may interact to specify configuration information or data for the network devices of service provider network 16 that provide the one or more services to customer networks 18.

Access network 12 represents a sub-network of service provider network 16 that facilitates access by customer networks 18 to service provider network 16. Commonly, access network 12 provides what may be referred to as the "last mile" of access between customer networks 18 and service provider network 16. Access network 12 includes a switch 32 and access nodes 34A-34N ("access nodes 34"). Switch 32 represents an aggregation device that aggregates traffic from access nodes 32 for delivery upstream to public network 14 and that distributes traffic from public network 14 downstream to access nodes 34. Generally, the term "upstream traffic" refers to traffic from customer networks 18 to public network 14 and the term "downstream traffic" refers to traffic from public network 14 to customer networks 18. Each of access nodes 34 represents a network device that manages access of one or more customer networks 18 to service provider network 16. In the context of fiber links 22, access nodes 34 may represent optical line terminals (OLTs) that manage access of one or more customer networks 18 and, typically, DPDs 24 to service provider network 16.

While shown as including a single access network 12 in the example of FIG. 1 for ease of illustration, service provider network 16 may include multiple access networks that are substantially similar to access network 12. Moreover, while shown as including only a single switch in the example of FIG. 1, also for ease of illustration, access network 12 may include multiple switches that each aggregate traffic for multiple access nodes. The techniques should not therefore be considered limited in these respects to the example shown in FIG. 1.

With the recent surge of consumers adopting high-speed Internet service in addition to migration of video and telephony services from dedicated transport infrastructures (i.e., coaxial cable for video data transport and copper line infrastructures for telephony data transport) to the packet-switched data or Internet infrastructure, consumer bandwidth requirements have increased dramatically. As a result of this growth in consumer bandwidth requirements, service providers have begun upgrading their access networks to support higher bandwidth applications, such as Voice over IP (VoIP) applications and IP television (IPTV). To provide abundant bandwidth to consumers, some service providers upgraded access networks to provide fiber to the premises (FTTP), where fiber links typically provides the largest bandwidth per consumer of any competing physical communication mediums, such as coaxial cable and copper lines.

Typically, the service provider utilized these fiber links to provide a passive optical network (PON), which is a type of optical network architecture that relied on unpowered optical splitters to enable a single optical fiber link to service multiple premises. Various types of PONs have been developed, each of which offer certain benefits in terms of bandwidth, connection speeds, and interoperability with other types of L2 protocols. For example, Ethernet PON (EPON) was developed to facilitate delivery of L2 Ethernet packets (which may be referred to as Ethernet "frames") over a PON. Asynchronous transfer mode (ATM) PON ("ATM PON") was developed to carry ATM cells over a PON. Broadband PON (BPON) is an evolution of the APON that provided better bandwidth allocation and management in comparison to APONs. Gigabit PON (GPON) was developed as an evolution of the BPON and supports higher data rates than BPON, as well as, providing enhanced security and supporting multiple L2 protocols (i.e., ATM, GPON encapsulation method (GEM) and Ethernet).

While PONs provide a number of benefits in terms of facilitating the delivery of large amounts of data between public network 14 and customer networks 18, the various different types of PONs are typically more difficult to manage because downstream optical splitters that split a fiber between two or more of customer networks 18 cannot transmit or otherwise provide any management information back to access nodes 34 that might assist troubleshooting any network connectivity or other issues. Moreover, PON interfaces vary widely between manufacturers for the same type of PON, impeding interoperability between devices manufactured by different manufacturers (although GPON provides for a standardized interface to facilitate such interoperability). Furthermore, OLTs and ONTs for PONs are often expensive in that these PON devices are not widely deployed throughout all types of networks, but are limited mainly to access networks. The lack of widespread adoption increases the cost of the device itself and the cost of maintaining or otherwise managing these devices from an information technology (IT) perspective, as not all IT personnel may be experienced in managing these devices.

The above noted PON difficulties have led to the development of more active fiber access architectures that are Ethernet-based. Ethernet is a widely deployed L2 protocol that provides for a standard interface and is capable of very high bandwidth (on the order of two or three times that of even the highest bandwidth PONs). Specifically, an architecture referred to as "active Ethernet" or "AE" is specified in an Institute of Electrical and Electronics Engineers (IEEE) 802.3-2008 standard (where this standard defines Ethernet for the first mile), which is hereby incorporated by reference as if fully set forth in its entirety herein. Active Ethernet deployments require that the passive optical splitters located within service provider cabinets proximate to customer networks 18 be replaced with so-called "active" Ethernet switches, where the term "active" refers to the fact that these Ethernet switches require power in order to actively switch Ethernet frames over fiber links 22. Considering that these Ethernet switches are active, the active Ethernet switches may provide status and other information to facilitate troubleshooting of network and/or customer issues, providing a better view into access network 12 in comparison to PON architectures. Moreover, by actively managing links 22, active Ethernet switches may greatly increase the amount of bandwidth provided to customer networks 18 in comparison to passively switched PONs.

While AE is a relatively mature and hardened (in the sense of being more fault resistant and tolerant) architecture, no cohesive way of provisioning AE access networks has been developed. The most common deployment of AE relies on what may be referred to as "basic" DPDs that are typically basic in terms of the services they offer and more often than not are not intended to be managed remotely via provisioning system 30. Typically, when installing DPDs 24 within the customer premises to terminate access network 12 and provide the transition between the physical medium of access network 12 (i.e., fiber links 22) and the physical communication mediums of customer networks 18, the installer configures each of DPDs 24 locally. In this deployment, the Ethernet switches described above that are positioned in the cabinet proximate to customer networks 18 and intermediate to access nodes 34 and DPDs 24 (but not shown in the example of FIG. 1 for ease of illustration purposes) may be more advanced in terms of management and provisioning services offered by these devices. Typically, this form of AE is deployed when upgrading an existing PON infrastructure to an AE infrastructure in that it may leverage the DPDs used in supporting the PON for providing AE. Thus, while access nodes 34 and the intermediate Ethernet switches may be remotely provisioned, the basic DPDs still must be provisioned locally or by way of an overly complicated remote process.

In an alternative, but less commonly utilized, deployment of AE, more advanced DPD devices are utilized to provide AE within access network 12. These DPDs are specifically designed to provide Ethernet access. The advanced DPDs may be provisioned remotely via provisioning system 30. The advanced DPDs are generally paired with a more basic Ethernet aggregation device located in the cabinet proximate to customer networks 12. While this advanced DPD is capable of being remotely provisioned, the advanced DPDs are not widely deployed considering that they are typically very expensive. Moreover, deployment of these more advanced DPDs is commonly limited to new network outlays to extend service to areas where fiber access has not been provided.

As a result, any given service provider typically includes both the more basic form of DPDs and the more advanced form of DPDs. The likely combination of basic and advanced DPDs in any given service provider network fragments the management and provisioning of access networks into two different types, i.e., those that can be remotely provisioned and those that cannot be remotely provisioned. Moreover, even assuming that a service provider deploys only the more advanced form of DPDs within all of its access networks and thereby overcomes the issues surrounding remote provisioning, often the service provider purchases, over time, DPDs from different manufactures, which then may potentially require two or more different provisioning systems similar to provisioning system 30, thereby fragmenting the provisioning and management of these DPDs by manufacturer. Furthermore, in access networks that employ only the more advanced form of DPDs, the provisioning system may directly provision these more advanced forms of DPDs without provisioning the access nodes to provide the services to these directly provisioned DPDs. Consequently, the provisioning of access network may be fragmented into provisioning DPDs and provisioning access nodes, which may occur differently and require different provisioning systems to accommodate these different devices. In this sense, there may be no unified or cohesive way of provisioning Ethernet-based access networks.

In accordance with the techniques described in this disclosure, access nodes 34 may be adapted to discover DPDs 24 utilizing any number of different discovery mechanisms, such as link operations, management and administering (OAM) protocol set forth in clause 57 of the above noted IEEE 802.3-2008 standard. Access nodes 34 may automatically discover DPDs 24 using the link-layer OAM protocol regardless of whether these DPDs 24 support acquisition of a unique L3 address that is unique within public network 14 or not. That is, some DPDs 24 may not, for example, support DHCP by which to request an IP address for use in accessing public network 14. Because access nodes 34 employ a L2 discovery protocol in the form of the link-layer OAM protocol, access nodes 34 may discover both the more basic types of DPDs 24 and the more advanced types of DPDs 24 that are capable of requesting an IP address via DHCP for use in accessing public network 14.

While described herein with respect to link-layer OAM protocol, the techniques are not limited to this network discovery protocol. In some instances, access nodes 34 may utilize, as one example, a discovery protocol set forth in IEEE 802.1x standard for port-based network access control (PNAC). Moreover, access nodes 34 may implement multiple different discovery protocols and invoke each of these different discovery protocols in turn so as to discover both basic and more advanced DPDs.

After discovering DPDs 24, access nodes 34 may proceed to authenticate those of DPDs 24 discovered using the discovery protocol. Access nodes 34 typically authenticate discovered ones of DPDs 24 prior to permitting these discovered DPDs 24 access to service provider network 14. DPDs 24 may transmit a unique identifier either in the form of a L2 MAC address or some other unique device identifier sent via a defined type-length-value (TLV) field (such as a device serial number) of the discovery protocol. That is, the link-layer OAM protocol supports user-defined TLV fields to extend or otherwise expand what data may be communicated between link-layer OAM protocol compliant devices, such as access nodes 34 and DPDs 24. DPDs 24 that implement link-layer OAM protocol may be configured to append this TLV field to link-layer OAM protocol messages sent from DPDs 24 to access nodes 34. Access nodes 34 may receive these link-layer OAM protocol messages and extract the device serial number from the TLV field appended to these messages. Access nodes 34 may then authenticate these DPDs 24 using either the MAC address, which is specified in a required field of the link-layer OAM protocol messages, or any other unique device identifier specified in a TLV field of the link-layer OAM protocol messages.

To authenticate discovered ones of DPDs 24, access nodes 34 may access a local data structure, such as a table, stored locally within each of access nodes 34 or a remote data structure, such as a table, stored by an authentication device in back office network 20 that defines permitted devices by either MAC address or any other unique device identifier. Access nodes 34 may determine whether the MAC address or other unique device identifier provided when discovering these DPDs 24 is present within the local or remote table of permitted MAC addresses or other unique device identifier. If not present within one of these tables, access nodes 34 may deny these DPDs 24 access to service provider network 16, effectively denying the associated one of customer networks 18 access to any services to which that customer may have subscribed. If, however, access nodes 34 determine that the MAC address or other unique device identifier associated with the discovered ones of DPDs 24 are present in the table, access nodes 34 may permit these discovered DPDs 24 access to service provider network 16, effectively allowing the corresponding ones of customer networks 18 access to service provider network 16 and any services to which that customer may have subscribed.

Access nodes 34 may authenticate discovered ones of DPDs 24 using MAC authentication, as described above, or some variation of MAC authentication that involves other types of unique device identifiers, such as a device serial number. Alternatively, access nodes 34 may authenticate DPDs 24 in accordance with the IEEE 802.1x standard.

When authenticating DPD 24 in accordance with the IEEE 802.1x standard, access nodes 34 may require that DPDs 24 provide authentication data, such as a username and password. This authentication data may be pre-configured within DPDs 24 by the service provider, configured during installation of DPDs 24 in the customer's premises or configured by the customer. Regardless, access nodes 34 receive this authentication data and typically then communicate with an authentication, administration, and accounting (AAA) database, such as that provided by a remote dial in user access service (RADIUS) server (which is not shown in the example of FIG. 1 for ease of illustration purposes), located in back office network 20. Access nodes 34 may therefore implement, in some instances, a RADIUS protocol to communicate with the RADIUS server located in back office network 20 to authenticate those discovered ones of DPDs 24.

After successfully authenticating DPDs 24, access nodes 34 then provisions these DPDs 24. To provision the discovered ones of DPDs 24, access nodes 34 may first determine whether these DPDs 24 are basic or advanced in terms of whether these DPDs 24 support link-local provisioning or network-wide provisioning. As noted above, DPDs 24 are considered "basic" in this disclosure if they support link-local provisioning, while DPDs 24 are considered "advanced" in this disclosure if they support network-wide provisioning. Those DPDs 24 that support link-local provisioning typically only enable remote provisioning within a given subnet, such as within access network 12. These basic DPDs therefore typically cannot be readily provisioned via a device located outside of access network 12, such as by provisioning system 30 located in back office network 20. Some of these basic DPDs may not support provisioning over a L3 connection in that these DPDs may not provide a full network stack that enables acquisition of even a link-local IP address. Access nodes 34 may provision these devices using a L2 protocol, such as the above-noted link-layer OAM protocol. Access nodes 34 may readily establish a L3 connection with those DPDs 24 that are advanced, considering that these advanced DPDs 24 may communicate with DHCP server 28 to retrieve a network-wide IP address for use in accessing public network 14.

Access nodes 34 may determine whether each of these DPDs 24 are basic or advanced in terms of their IP connectivity when discovering these devices. Access nodes 34 may maintain an operator preference list on a per-interface or per-system basis that defines how these DPDs are to be authenticated and provisioned. The list may associate discovery protocols, authentication protocols and IP capabilities with a MAC address, device serial number (or other unique device identifier), or any other data commonly provided via a TLV field to access nodes 34 (such as a vendor identifier) associated with each of DPDs 24. Access nodes 34 may then perform a lookup in this operator preference list based on a MAC address, other unique device identifier, a device class identifier and/or other parsed TLV field data determined for each of the discovered ones of DPDs 24 to determine how to authenticate and provision or configure these DPDs 24.

Based on the data retrieved from this lookup, access nodes 34 may then provision DPDs 24 so as to establish some form of either L3 or L2 connectivity by which provisioning data from provisioning system 30 can be transferred to DPDs 24 via access nodes 34. In this manner, access nodes 34 may act as a "provisioning bridge" that bridges connectivity gaps that conventionally limit backend provisioning of certain devices in Ethernet-based access networks that have limited or non-existent IP presences, such as the more basic ones of DPDs 24 that either provide for link-local IP addressability or no IP addressability. Rather than require local provisioning during install, which is open to user error, and subsequent local provisioning, which is expensive as it requires IT personnel to visit the customer premises, to update those of the DPDs 24 that do not provide for even link-local IP addressability, the techniques described in this disclosure may enable remote provisioning of these more basic ones of DPDs 24 via provisioning system 30.

Moreover, for those basic ones of DPDs 24 that provide for link-local IP addressability, access nodes 34 may overcome the connectivity gap that occurs between provisioning system 30 and these ones of DPDs 24 because these ones of DPDs 24 may not communicate outside of access network 12. In this instance, access nodes 34, which do provide for network-wide IP addressability, act as an intermediate between provisioning system 30 and these more basic ones of DPDs 24 to retrieve provisioning data and provide DPD status data on behalf of these more basic ones of DPDs 24. Access nodes 34 may also provide some amount of translation to promote interoperability between different provisioning protocols. This translation aspect of the techniques may be utilized with respect to both basic and advanced types of DPDs 24. Commonly, DPDs 24 implement some form of file transfer protocol (FTP) as a provisioning protocol, while provisioning system 30 may implement some proprietary form of provisioning protocol. Access nodes 34 may act, in this instance, as a management or provisioning bridge to bridge the provisioning protocol gap between provisioning system 30 and DPDs 24.

With respect to these more advanced ones of DPDs 24, provisioning system 30 may in some instances interface directly with these DPDs 24 due to their support of network-wide IP addressability. In these instances, these more advanced ones of DPDs 24 may be adapted to support various aspects of the technique described in this disclosure so as to inform access nodes 24 that these more advanced ones of DPDs 24 have been provisioned to provide one or more services provided via service provider network 16. Access nodes 24 may, in these instances, not be responsible for configuring these more advanced ones of DPDs 24 but may receive this information regarding the provisioning of services so that access nodes 24 may retrieve the necessary information from provisioning system 30 to configure its interfaces to provide these one or more services to these more advanced forms of access nodes 24. The techniques may offer a unified or cohesive way of provisioning various types of DPDs 24 so that all of the devices necessary to provide services to customers are configured appropriately. Access nodes 24 may implement other aspects of the techniques in these instances so as to appropriately retrieve service configuration data from provisioning system 30 that defines configuration data for providing the services already provisioned on the more advanced forms of DPDs 24.

In this way, the techniques described in this disclosure provide scalable layer two (L2) provisioning of network devices located in Ethernet-based access networks. The techniques may provide this form of L2 provisioning of network devices by enabling access nodes located in the access networks to act as what may be referred to as a "provisioning bridge" or "management bridge." Access nodes implement the techniques described in this disclosure to provide a link-local IP address for those more basic DPD devices that are not typically designed for remote provisioning. Using this link-local IP address, the access node may push provisioning data from and report DPD status data to a provisioning system located remotely from the access network in a back office network of a service provider (SP) network. The techniques may also facilitate the provisioning of advanced DPDs that are capable of remote provisioning by providing what may be referred to as an "interworking function." The access node may implement this aspect of the techniques to bridge differences in provisioning protocols supported by the provisioning system and the advanced DPDs. That is, the access node may translate provisioning messages sent in accordance with a first provisioning protocol into provisioning messages that comply with a provisioning protocol supported by a targeted one of the advanced DPDs. In this manner, the techniques may reduce if not eliminate communication issues that occur between provisioning systems and advanced DPDs.

The techniques may also provide a scalable form of L2 provisioning for network devices located in Ethernet-based access networks. The techniques may facilitate scaling in that the access node may be extended to provide a bridge between any number of DPDs (regardless of whether these DPDs are basic or advanced) and the back-end provisioning system. The techniques may overcome provisioning issues that occur as a result of the lack of remote provisioning support provided by basic DPDs while also addressing compatibility issues that occur between more advanced DPDs and the provisioning system. By implementing the techniques described in this disclosure, the access nodes may provide a form of provisioning bridge that is capable of provisioning DPDs via any number of different provisioning schemes provided by way of the above noted interworking function such that DPDs may be provisioned by any provisioning system regardless of whether the DPDs support the same provisioning protocol as that employed by the provisioning system. The techniques may therefore facilitate a central cohesive provisioning Ethernet-based access networks.

Figure 2A:
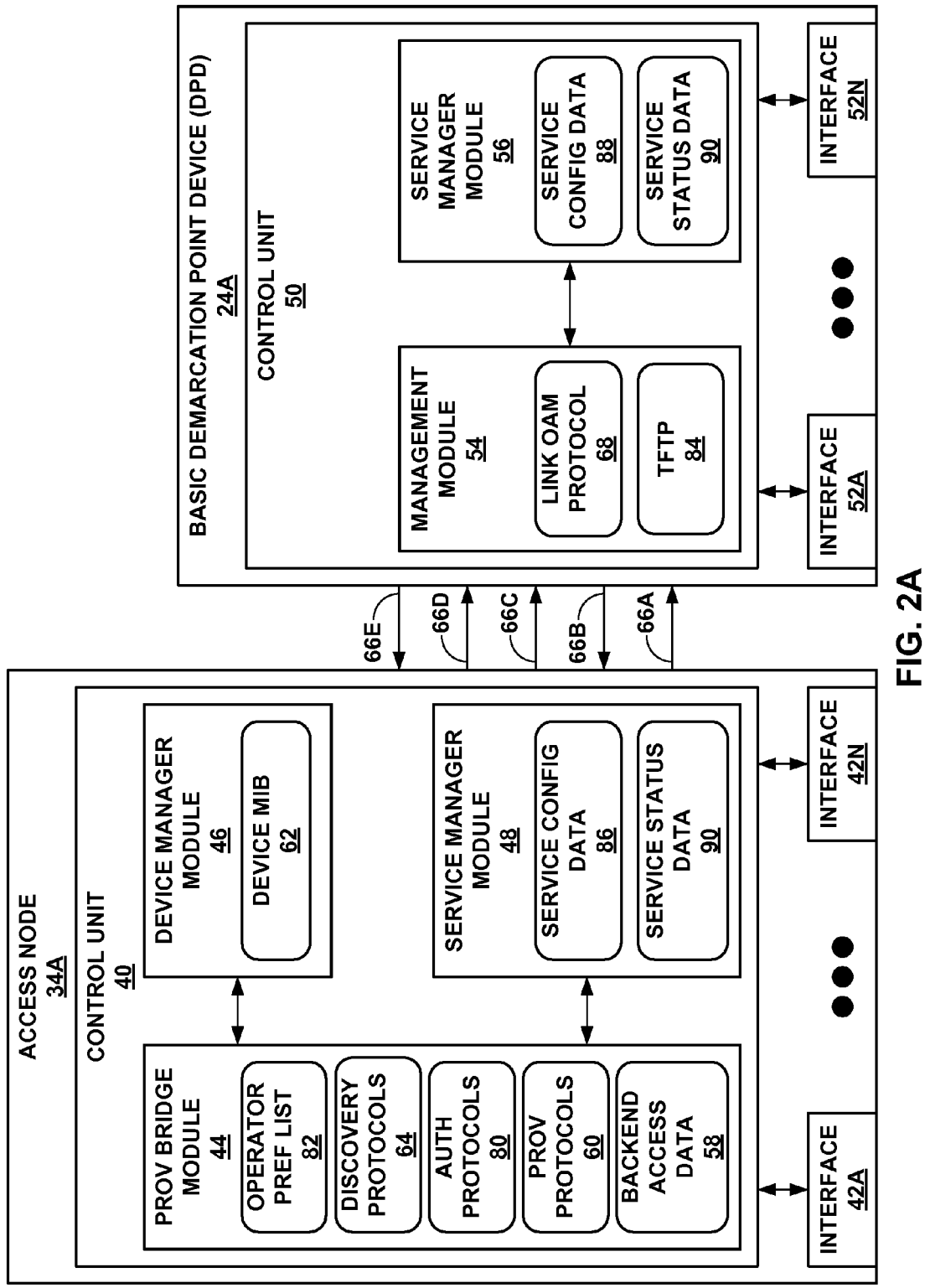
FIGS. 2A-2B are block diagrams illustrating in more detail network system shown in the example of FIG. 1.
Figure 2B:
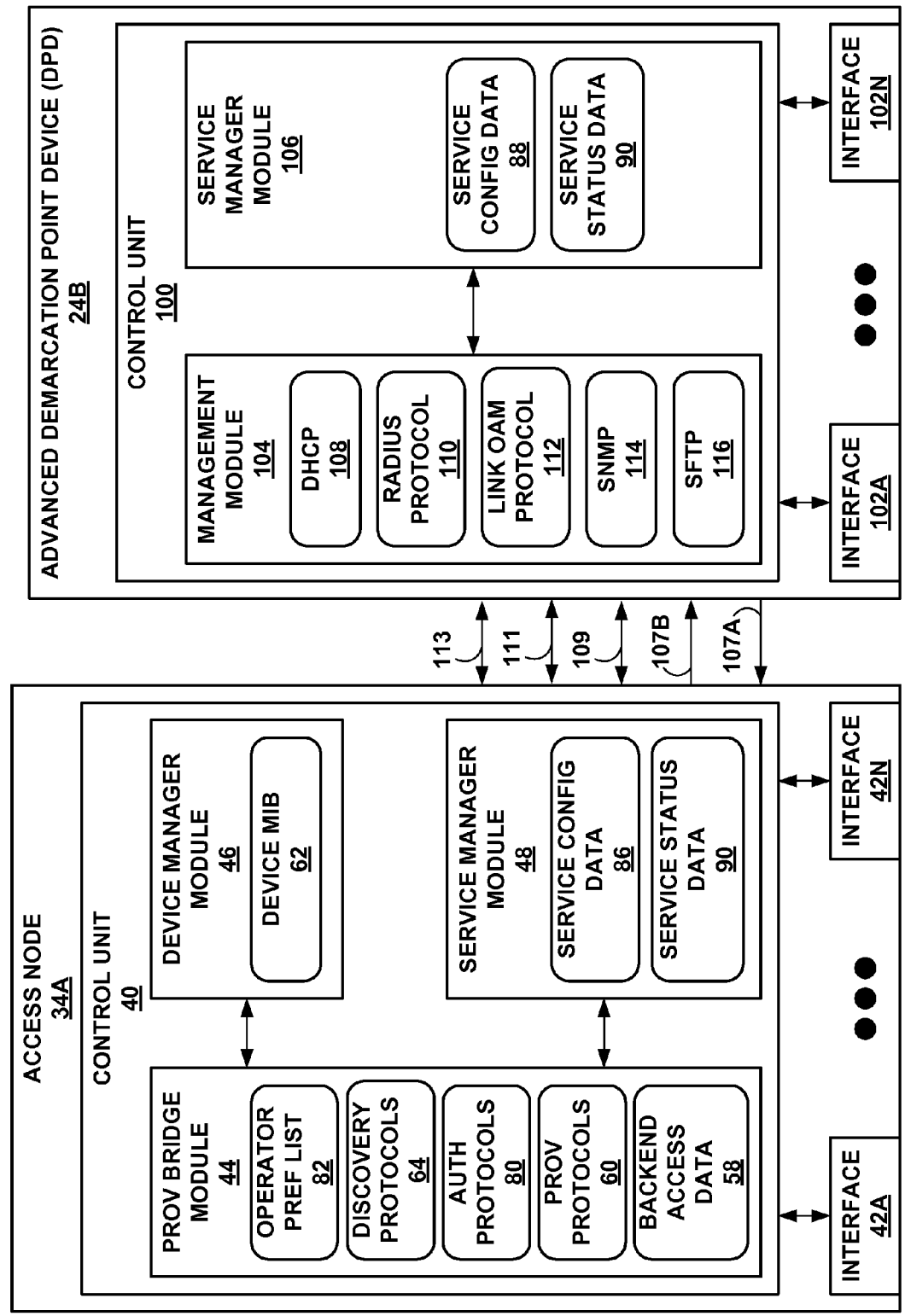

FIGS. 2A-2B are block diagrams illustrating in more detail network system 10 shown in the example of FIG. 1. FIG. 2A is a block diagram illustrating access node 34A and DPD 24A of network system 10 of FIG. 1 in more detail. DPD 24A is assumed to represent a basic DPD 24A for purposes of illustration and is denoted as basic DPD 24A in FIG. 2A for this reason. In the example of FIG. 2A, access node 34A includes a control unit 40 and interfaces 42A-42N ("interfaces 42"). Control unit 40 may represent one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 40 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Each of interfaces 42 represents an interface for interfacing with a physical communication medium, such as a different one of fiber links 22A-22M. An interface card (IFC) may comprise one or more of interfaces 42, which in this context may be referred to as ports. Each IFC may be inserted into a slot of a chassis that couples to control unit 40 via a backplane or other high-speed interconnection.

Control unit 40 includes a provisioning bridge module 44 ("prov bridge module 44"), a device manager module 46 and a service manager module 48. Provisioning bridge module 44 represents a module that implements the techniques described in this disclosure to bridge connectivity and provisioning gaps between provisioning system 30 and, in this example, basic DPD 24A. Device manager module 46 represents a module that manages DPDs 24A-24M and any other device downstream from access node 34A that is necessary to deliver services to customers, such as the Ethernet switches located in a cabinet intermediate to access node 34A and DPDs 24A-24M. Service manager module 48 represents a module that manages the delivery of services by access node 34A downstream to DPDs 24A-24M.

Also as shown in the example of FIG. 2A, basic DPD 24A includes a control unit 50 and interfaces 52A-52N. Control unit 50 may, similar to control unit 40 of access node 34A, represent one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 50 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Each of interfaces 52 represents an interface for interfacing with a physical communication medium, such as fiber link 22A and any customer premises physical mediums, such as coaxial cable, copper line, cat5 cable, etc. An interface card (IFC) may comprise one or more of interfaces 52, which in this context may be referred to as ports.

Control unit 50 includes a management module 54 and service manager module 56. Management module 56 represents a module by which an administrator or other operator (such as an installer) may interface either locally or remotely to administer, configure or provision, operate or otherwise generally manage basic DPD 24A. Service manager module 56 represents a module that configures or provisions and otherwise generally manages delivery of services to customer network 18A to which the corresponding customer has subscribed.

Initially, upon powering-up, starting or otherwise activating access node 34A, an administrator generally configures access node 34A to access provisioning system 30. The administrator may configure access node 34A to access provisioning system 30 via secure FTP (SFTP). The administrator may interface with access node 34A via a user interface presented by a user interface module (not shown in the example of FIG. 2A for ease of illustration purposes) to configure access node 34A in this manner. Control unit 40 may receive this administrator-entered configuration data and invoke provisioning bridge module 44, which may store this configuration data as backend access data 58. Backend access data 58 indicates which of provisioning protocols 60 are to be used to communicate with provisioning system 30, as well as, any other information that may be required to access provisioning system 30, such as an IP address, FTP server addresses to download configuration data, etc. Provisioning bridge module 44 may implement one or more provisioning protocols 60, such as to some extent certain aspects of link-layer OAM, certain aspects of the 802.1x standard, FTP, SFTP, trivial FTP (TFTP), SNMP, proprietary or extended versions of each of the foregoing or any other provisioning protocols and/or any other open, standards-based or proprietary provisioning protocol.

Also, when initially powered-up, started or otherwise activated, control unit 40 of access node 34A invokes device manager module 46, which creates a device management information base (MIB) 62. This device MIB 62 may represent a data structure, such as a table, that includes entries or other nodes that are each associated with a different unique device identifier (such as a MAC address, device serial number or other type of unique device identifier) assigned to DPDs 24, a vendor identifier that manufactured DPDs 24 or some other data by which to identify provisioning data to be used to provision DPDs 24. Device MIB 62 is typically empty upon creation in that it does not currently store any entries associated with a unique device identifier, vendor identifier or other data by which to identify provisioning data to be used to provision DPDs 24.

Typically, when creating device MIB 62, device manager module 46 populates certain aspects of device MIB 62 with default data, such as commonly used discovery protocols and configuration or provisioning protocols. Below is an example MIB entry defined for ports 1-N of slots 1-N, where port 1-N refers to all of interfaces 42 and slots 1-N refers to all of the slot in which an interface comprising ports 1-N is inserted:

Slot (1 . . . N)
  a. Port (1 . . . N)
    i. Device Unique ID (Read/Write) (MAC Address of the Demarcation Point Device)
    ii. Discovery Protocol (ReadOnly) (Link OAM)
    iii. Configuration Protocol (ReadOnly) (TFTP)
    iv. Device State (ReadOnly) (None, Discovered, Authorized, Configured, Failed)
    v. Device Model (ReadOnly)
    vi. Device Hardware Revision (ReadOnly)
    vii. Device Firmware Revision (ReadOnly)
    viii. Configuration File Name (Read/Write)
    ix. Firmware File Name (Read/Write)
    x. IP Address (Read/Write)
    xi. Management VLAN (Read/Write)
    xii. Gateway IP Address (Read/Write)
    xiii. Configuration Server IP Address (Read/Write)
    xiv. Firmware Server IP Address (Read/Write)
    xv. Reboot (WriteOnly)
    xvi. Authorize (WriteOnly)

In this example of MIB 62, default values are assigned for the device unique ID used to authenticate a device (i.e., a MAC address of DPDs 24 in this example), discovery protocol (i.e., link OAM in this example) and the configuration protocol (i.e., TFTP in this example). Device manager module 46 may be configured to create device MIB 62 with these default values. With respect to each of fields i-xvi, device MIB 52 indicates whether each field is read only, write only or both read and write (read/write), as well as, potential acceptable states or values that can be stored to some of these fields. For example, field iv of device MIB 62 indicates possible device states as none, discovered, authorized, configured or failed.

In any event, after creating device MIB 62 and populating device MIB 62 with default data, control unit 40 invokes provisioning bridge module 44 to execute one or more of discovery protocols 64. Provisioning bridge module 44 may interface with device manager module 46 to access device MIB 62 so as to determine which of discovery protocols 64 to execute in order to discover DPDs 24A-24M. Given that device MIB 62, as shown above, specifies a default discovery protocol of link OAM for all slots and ports, device manager module 46 indicates that provisioning bridge module 44 execute the link OAM discovery protocol. Provisioning bridge module 44 then executes the link OAM one of discovery protocols 64 for each of interfaces 42 to discover DPDs 24A-24M connected to access node 34A via fiber links 22.

In accordance with link OAM specified in clause 57 of IEEE 802.3-2008 standard, provisioning bridge module 44 periodically sends an OAM message 66A referred to as an OAM protocol data unit (OAMPDU) via link 22A to basic DPD 24A via one of interfaces 42, e.g., interface 42A. This OAMPDU may initiate discovery and include a number of TLV fields providing data about the link OAM capabilities of access node 34A. This link OAM capability data may include data defining a state of the link OAM protocol (whether active or passive which provides an indication of the functionality of link OAM as implemented by access node 34A), capabilities of link OAM as implemented by access node 34A (such as whether access node 34A supports loopback or unidirectional operation of the link OAM protocol), a vendor organization unique identifier (OUI) (which is usually controlled by the IEEE and is typically the first three bytes of the MAC address assigned to interface 42A), and vendor specific information, such as a 32-bit vendor identifier, which may be used to distinguish the type of platform in conjunction with the vendor OUI field. This data is usually defined via separate TLV fields within OAM message 66A.

DPD 24A receives OAM message 66A via one of interfaces 52, such as interface 52A, whereupon control unit 50 invokes management module 54. Management module 54 implements link OAM protocol 68. Typically, all DPDs 24, whether basic or advanced, implement the link OAM protocol, while some DPDs 24 may implement additional discovery protocols, such as that defined in accordance with IEEE 802.1x. For this reason, device manager module 46 populates device MIB 62 with the default value of link OAM when populating the discovery protocol for slots 1-N and ports 1-N for each of slots 1-N.

Returning to the example of FIG. 2A, management module 54 of basic DPD 24A processes OAM message 66A in accordance with link OAM protocol 68 and generates an OAM message 66B, again, in accordance with link OAM protocol 68. OAM message 66B may include substantially the same type of information as that of OAM message 66A. For example, this response message 66B includes a MAC address assigned to the one of interfaces 52, i.e., interface 52A in this example, that sent response message 66B as well as a state of link OAM protocol 68, capabilities of link OAM protocol 68, a vendor organization unique identifier (OUI) (which is usually controlled by the IEEE and is typically the first three bytes of the MAC address assigned to interface 52A), and vendor specific information, such as a 32-bit vendor identifier, which may be used to distinguish the type of platform in conjunction with the vendor OUI field.

This message 66B may also include data not required by the link OAM protocol in the form of additional type-length-value (TLV) fields. Management module 54 may determine whether or not to send these additional TLVs based on the vendor OUI and the vendor identifier. If the vendor OUI and vendor identifier parsed from message 66A match those determined by management module 54 for basic DPD 24A, management module 54 may include those additional TLV fields supported by the corresponding vendor for this particular platform (or type of access node 34A). These TLV fields may comprise proprietary fields that are unique to a given vendor or manufacturer of basic DPD 24A or widely adopted, but not proprietary, fields for extending the functionality of link OAM. Otherwise, if this vendor OUI and vendor identifier parsed from message 66A do not match those determined by management module 54 for basic DPD 24A, management module 54 more than likely adheres strictly to the link OAM protocol and does not extend this protocol beyond that specified in IEEE 802.3-2008 standard. Management module 54 transmits this OAM message 66B to access node 34A via interface 52A and link 22A.

Provisioning bridge module 44 receives this message 66B via interface 42A and link 22A. Provisioning bridge module 44 then parses this message 66B to extract the provided information, such as the MAC address, sate of link OAM protocol 68, capabilities of link OAM protocol 68, the vendor OUI and the vendor identifier. After parsing this information from message 66B, provisioning bridge module 44 may interface with device manager module 46 to update device MIB 62 with this parsed data. Assuming provisioning bridge module 44 receives this message 66B via interface 42A which is port 1 of the interface card installed into slot 1, provisioning bridge module 44 interfaces with device manager module 46 to update an entry in device MIB 62 associated with slot 1, port 1 with the parsed data. This entry of device MIB 62 may, as one example, be updated in the following fashion to specify an entry for slot 1, port 1:

Slot=1
  a. Port=1
    i. Device Unique ID=00:01:00:34:54:34
    ii. Device Discovery Protocol=Link OAM
    iii. Configuration Protocol=TFTP
    iv. Device State=Discovered
    v. Device Model=Model-X
    vi. Device Hardware Revision=1.1
    vii. Device Firmware Revision=1.1.3

In this example, OAM message 66A specifies a MAC address of 00:01:00:34:54:34 and specifies a device model as "Model-X," a device hardware revision as 1.1 and a device firmware revision of 1.1.3, where these last three values may be specified in TLV fields of OAM message 66A that are either proprietary or widely adopted but not proprietary. Referring again to the above example, the default values for the discovery protocol and configuration protocol have not been changed in response to OAM message 66B, although OAM message 66B may specify the use of other discovery protocols or configuration protocols using additional TLV fields. The techniques should therefore not be limited to this example. Provisioning bridge module 44 may also interface with device manager module 46 to update this entry of device MIB 62 so as to specify a device state for basic DPD 24A of "discovered" to reflect that access node 34A has discovered basic DPD 24A. In this manner, access node 34A may discover basic DPD 24A.

After discovering basic DPD 24A, provisioning bridge module 44 may then authenticate basic DPD 24A using a unique identifier assigned or associated with basic DPD 24A, such as a MAC address assigned to interface 52A and provided by way of message 66B. Provisioning bridge module 44 may communicate this MAC address parsed from OAM message 66B to the RADIUS server located in back office network 20 in accordance with one of authentication protocols 80, i.e., which is the RADIUS protocol in this example, and on behalf of basic DPD 24A. The RADIUS server may maintain a list of authorized MAC addresses and compare the provided MAC address to this list of authorized MAC addresses, authenticating this MAC address only if this provided MAC address matches one of the MAC addresses specified in the list of authorized MAC addresses.

Typically, the service provider may be informed of this MAC address prior to installing basic DPD 24A at the customer premises or upon activating basic DPD 24A via a work order or some other out-of-band communication. Assuming the RADIUS server authenticates basic DPD 24A, the RADIUS server issues a message in accordance with the RADIUS protocol informing access node 24A that basic DPD 24A has been authenticated. Provisioning bridge module 44 may then interface with device manager module 46 to update the device status within the entry of device MIB 62 associated with slot 1, port 1 to "authorized." Although described as requiring an external authentication server, access node 34A may be provisioned to perform this authentication locally with respect to an authorized device list stored locally by, for example, device manager module 46. The techniques should therefore not be limited to this described example.

Meanwhile, provisioning bridge module 44 may perform what may be referred to as an initial configuration or provisioning via the link OAM protocol of discovery protocols 64. In this sense, the link OAM protocol may comprise a combination of a discovery protocol, an authentication protocol (in the sense that it facilitates MAC authentication) and a provisioning protocol. Thus, while the link OAM protocol may generally be described as a discovery protocol, the link OAM protocol should not be limited to this general description. Likewise, many of the protocols described herein may perform more than one operation that would exclude it from consideration as being a strictly discovery-based, authentication-based, or provisioning-based protocol. The terms used to describe these protocols in this disclosure are utilized only to capture their potential use with respect to the techniques described in this disclosure and should not be used to limit or otherwise constrain the techniques in any way.

In any event, provisioning bridge module 44 may interface with basic DPD 24A via the link OAM protocol of discovery protocols 64 to perform an initial and typically network-based provisioning of basic DPD 24A. That is, provisioning bridge module 44 may interface with basic DPD 24A via the link OAM protocol to provision basic DPD 24A with a link-local IP address, a virtual local area network (VLAN) used to communicate with access node 34A, a management server IP address (which in this instance is an IP address assigned to access node 34A and associated with service manager module 48). Basic DPD 24A may utilize the link-local IP address and the VLAN to communicate with access node 34A and the management server IP address to retrieve configuration files.

In some instances, basic DPD 24A may not support IP addressability. Provisioning bridge module 44 may determine whether any given one of DPDs 24 support IP addressability based on a trial-and-error approach where provisioning bridge module 44 attempts to provision basic DPD 24A for IP addressability and if that fails, resorts to provisioning basic DPD 24A via the L2 link OAM protocol. Alternatively, provisioning bridge module 44 may store data defining an operator preference list 82 that associates one or more of the unique device identifier, vendor OUI, and vendor identifier with entries of the list, where each entry identifies a supported level of IP addressability, an order of preference with regard to attempting to employ authentication protocols 80 with respect to associated DPDs 24, and an order of preference with regard to attempting to employ one or more of provisioning protocols 60 with regard to the associated DPDs 24. Provisioning bridge module 44 may access operator preference list 82 using one or more of the MAC address, vendor OUI, and vendor identifier discovered via OAM message 66B to determine a supported level of IP addressability and which of authentication protocols 80 and provisioning protocols 60 to utilize when authenticating and provisioning basic DPD 24A.

An example operator preference list 82 follows below.
Discovery and Authentication Protocol
802.1x
Link OAM with Vendor X extensions
Link OAM with Vendor Y extensions
Link OAM with Vendor X extensions for model Y
Vendor Information
Vendor X is MAC OUI 010203
Vendor Y is MAC OUI 334422

In this example, operator preference list 82 indicates that the discovery and authentication protocols 64 and 80 should be tried such that first 802.1x is attempted, then the link OAM protocol with vendor X extensions, then the link OAM protocol with vendor Y extensions, and finally the link OAM protocol with vendor X extensions for models from vendor Y. The vendor information in this example operator preference list 82 specifies how to identify vendor X (i.e., by a vendor or MAC OUI of 010203 in this example) and vendor Y (i.e., by a vendor or MAC OUI of 334422 in this example). In this way, provisioning bridge module 44 may define operator preference list 82 for use in determining discovery protocols 62 for use in subsequent discovery operations and authentication protocols to use when authenticating basic DPD 24A.

Provisioning bridge device 44 may, after authenticating basic DPD 24A, also interface with provisioning system 30 to inform provisioning system 30 of recently discovered basic DPD 24A. Provisioning bridge device 44 may interface with provisioning system 30 based on backend access data 58, which may define, as described above, one of provisioning protocols 60 to use to communicate with provisioning system 30, an IP address assigned to provisioning system 30 and other data necessary to communicate with provisioning system 30. Assuming backend access data 58 indicates that provisioning bridge module 44 should use the SNMP of provisioning protocols 60, provisioning bridge module 44 establishes an SNMP session with provisioning system 30 to inform provisioning system 30 of basic DPD 24A. Via this SNMP session, provisioning bridge module 44 may communicate data stored to the entry of device MIB 62 associated with basic DPD 24A, which in this example is assumed to be the data located at the entry of device MIB 62 associated with slot 1, port 1.

The service provider may specify that basic DPD 24A execute a certain version of firmware, such as firmware version 1.2. The network administrator may configure provisioning system 30 such that, upon being informed that basic DPD 24A, executes a version of the firmware that is less than that desired, provisioning system 30 may communicate with provisioning bridge module 44 via SNMP that this firmware needs to be updated. More specifically, provisioning system 30 may specify via SNMP that provisioning bridge module 44 update the firmware file name in the entry associated with DPD 24A in device MIB 62 such that this firmware file name refers to the newer version of the firmware. Likewise, provisioning system 30 may specify a configuration filename in this same entry. The configuration file may specify configuration data that configures basic DPD 24A to deliver the one or more services subscribed to by the customer that owns and operates customer network 18A.

To cause basic DPD 24A to download this new version of the firmware and the configuration file, provisioning system 30 may send a restart command to access node 34A commanding that basic DPD 24A restart. Provisioning bridge module 44, upon receiving this command on behalf of basic DPD 24A, issues restart command in another link OAM message 66C in accordance with the link OAM protocol of discovery protocols 64. In response to receiving this restart command specified in link OAM message 66C, management module 54 performs a reboot of basic DPD 24A. While being restarted, provisioning bridge module 44 fails to detect basic DPD 24A for a set period of time and then interfaces with device manager module 46 to update the device status in the entry associated with basic DPD 24A in device MIB 62 to indicate that this device has failed.

Once basic DPD 24A powers up or otherwise becomes active, provisioning bridge module 44 once again discovers and authenticates basic DPD 24A. Additionally provisioning bridge module 44 interfaces with device manager module 46 to update the device status field of the entry associated with basic DPD 24A within device MIB 62 such that it indicates that basic DPD 24A has once again been authorized to access service provider network 16. Once authorized, provisioning bridge module 44 may determine which one of provisioning protocols 60 to use when provisioning basic DPD 24A through a lookup of operator preference list 82 and then communicates the information from the entry associated with basic DPD 24A of device MIB 62 to basic DPD 24A. It is assumed this information is communicated via the link OAM protocol of provisioning protocols 60, however, any provisioning protocol may be employed to provide this information to basic DPD 24A. In this example, therefore, provisioning bridge module 44 generates and transmits one or more OAM messages 66D to basic DPD 24A that specify this data.

In response to receiving OAM message 66D, management module 54 parses the data from OAM message 66D and compares its current firmware filename to the firmware filename specified by this data. If the firmware filenames match, management module 54 takes no further action. If the firmware filenames do not match, management module 54 access the IP address specified in this data as firmware server IP address in accordance with TFTP 84 and retrieves the firmware filename specified in this data parsed from OAM messages 66D. Typically, basic DPDs 24A does not save the configuration file to persistent storage and retrieves this configuration file every time it reboots. However in some instances where basic DPD 24A stores this configuration file to persistent storage, management module 54 may, if the configuration filenames do not match, access the IP address specified in this data as configuration server IP address in accordance with TFTP 84 and retrieves the configuration filename specified in this data parsed from OAM messages 66D. The configuration file may be named using a filename convention where the MAC address associated with interface 52A is used in the filename to make the file unique to this device.

As noted above, basic DPD 24A has been previously configured to retrieve this firmware file and configuration file from access node 34A in that access node 34A configured itself as the firmware server by specifying its IP address in the firmware server IP address field of the entry device MIB 62 associated with basic DPD 24A. Consequently, basic DPD 24A attempts to retrieve this firmware file from access node 34A via TFTP 84. In response to attempting to establish this TFTP session, provisioning bridge module 44 accepts the TFTP session in accordance with TFTP, which is represented in the example of FIG. 2A as one of provisioning protocols 60. In response to the request for the firmware file and the configuration file, provisioning bridge module 44 initiates a similar session (although it may be more secure in that this session may be a SFTP session) with provisioning system 30 or any other server that stores these files and retrieves these files on behalf of basic DPD 24A. After retrieving these files, provisioning bridge module 44 provides the retrieved firmware file and the retrieved configuration file via the TFTP session to management module 54.

Management module 54 then forwards this data as service configuration data 88 ("service config data 88") to service manager module 56, which applies this service configuration data 88 to update basic DPD 24A. Provisioning bridge module 44 may then receive another OAM message 66E indicating that these files have been successfully applied to basic DPD 24A. In response to this message 66E, provisioning bridge module 44 once again interfaces with device manager module 46 to update the device status field of the entry of device MIB 62 associated with basic DPD 24A such that it indicates that this device has been "configured." If message 66E indicates that one or more of the firmware and configuration files were not successfully applied, however, provisioning bridge module 44 interfaces with device manager module 46 to update the device status field of the entry of device MIB 62 associated with basic DPD 24A such that it indicates that this device has "failed."

In instances when access node 34A is actively involved in provisioning basic DPD 24A, the configuration file may include service configuration data used to provision access node 34A itself. When passing this configuration file to basic DPD 24A, provisioning bridge module 44 may parse this access node-specific configuration data from the configuration file and interface with service manager module 48 to store this data as service configuration data 86. The following is an example configuration file that includes configuration data for both access node 34A and basic DPD 24A:

Demarcation Point Device—Device ID
  Port 1=Required VLAN (100), Layer 2 classifier associated with the VLAN (Upstream Classifier)
Access Node—Device ID
  Slot 1, Port 1
    Match 100, change 1001 AND add 100
    Rate-limit 100 to 10 Mbits,2 Kbyte,1 Mbit,2 Kbyte
    Broadcast-control 10 pps
  #MIC=XXXXXXX In this configuration file, DPD 24A is configured such that port 1 of DPD 24A uses a VLAN tag of 100, while access node is configured such that slot 1, port 1 matches on the VLAN tag of 100 and changes this tag to 1001 and adds an outer tag of 100. Rate limiters on this interface 42A are also configured to limit the rate of VLAN 100 to 1 Mbits/sec on the upstream direction and 10 Mbits/sec on the downstream direction using a burst profile of 2 Kbyte. The access node configuration portion of this file also specifies a broadcast control of 10 packets per second (pps). The access node-specific configuration data also defines a message integrity code (MIC), which is used between access node 34A and provisioning system 30. When removing this code, access node 34A typically regenerates the configuration file with a different MIC that corresponds to the MIC used between provisioning system 30 and basic DPD 24A, as each device commonly is assigned its own MIC. Moreover, access node may utilize a different filename and encoding methodology to provide additional security and isolation between DPD 24A and service provider network 16.

This same process of updating a configuration file may be performed when the customer that owns and operates customer network 18A requests a change of service. In response to this change request, a network administrator or other operator may employ provisioning system 30 to interface via provisioning bridge module 44 with device manager module 46 so as to update the configuration file name field of the entry of device MIB 62 associated with basic DPD 24A. The network administrator may replace the current configuration file name with one that specifies configuration data to configure the change in services. The network administrator, using provisioning system 30, may then interface with basic DDP 24A via provisioning bridge module 44 to once again issue a restart command similar to that issued via OAM message 66C. Basic DPD 24A restarts in response to receiving this message, and is subsequently discovered and potentially authenticated, at which point basic DPD 24A retrieves the configuration file specified via OAM messages similar to OAM messages 66D in a manner similar to that described above. The techniques may therefore provide a provisioning bridge both for providing the initial configuration or provisioning data and for subsequent configuration data updates.

Moreover, via provisioning bridge module 44, provisioning system 30 may also interface with device MIB 62 to remove service from a customer no longer subscribing for service with service provider network 16. To remove this service, provisioning system 30 may update the device identifier in the entry of device MIB 62 associated with basic DPD 24A such that this device identifier is set to "null." In response to updating device MIB 62 in this manner, access node 34A removes its service configuration data 86 for this interface 42A by which basic DPD 24A connects to access node 34A, effectively removing delivery of the previously subscribed-to services for this customer network 18A. In this manner, the techniques may facilitate removal of services for DPDs 24.

In some instances, basic DPD 24A may fail and require replacement. Through a back channel communication, such as work order, the service provider may delete the old entry in the authorized device list maintained by the authentication server and add a new entry for the new DPD. The process described above with respect to basic DPD 24A may be repeated to discover, authorize and provision this new DPD 24A may be repeated so as to enable delivery of the services to which the customer has subscribed.

With regard to security, some customers may attempt to use an unauthorized device by programming the MAC address of the interface of this unauthorized device with the MAC address associated with an authorized DPD. Yet, typically, the customer is unable to also implement the necessary OAM protocol appropriately, especially if this OAM protocol has been extended with proprietary TLV fields. Given the difficulty associated with appropriately implementing this OAM protocol, the techniques may provide a sufficient level of security so as to prevent unauthorized devices from maliciously gaining access to service provider network 16.

During execution of basic DPD 24A, service manager module 56 may store data capturing a status of the delivery of services subscribed to by the customer in the form of service status data 90. Service manager module 56 may transmit this service status data 90 to management module 54, which may upload this data via a TFTP session established in accordance with TFTP 84 to provisioning bridge module 44. Provisioning bridge module 44 may forward this data to service manager module 48 for later retrieval by provisioning system 30. Alternatively, or in conjunction with storing this data 90 locally, provisioning bridge module 44 may upload this data via a SFTP session established with provisioning system 30 or some other database or server in accordance with the SFTP protocol represented generally in the example of FIG. 2A as one of provisioning protocols 60. In this manner, the techniques may accommodate a pull form of reporting this service status data 90 in that provisioning system 30 may pull this data from local storage or a push form of reporting this service status data 90 in that access node 34A actively pushes this data to provisioning system 30.

FIG. 2B is a block diagram illustrating access node 34A and DPD 24B of network system 10 of FIG. 1 in more detail. DPD 24B is assumed to represent an advanced DPD for purposes of illustration and is denoted as advanced DPD 24B in FIG. 2B for this reason. In the example of FIG. 2B, advanced DPD 24B includes a control unit 100 that may be substantially similar to control unit 50 of basic DPD 24A and interfaces 102A-102B ("interfaces 102") that may be substantially similar to interfaces 52 of basic DPD 24A. Control unit 100 includes a management module 104 that may be similar to management module 54, although management module 104 is typically more advanced in that it supports network-wide IP addressability, and as a result, may be directly managed by provisioning system 30. Control unit 100 also includes a service manager module 106 that may be substantially similar to service manager module 56.

Typically, upon powering-up, starting or otherwise activating advanced DPD 24B, control unit 100 of advanced DPD 24B invokes management module 104. Once invoked, management module 104 issues a DHCP message 107A in accordance with DHCP 108 requesting that a network-wide IP address (as opposed to a link-local IP address) be assigned to advanced DPD 24B for use in accessing service provider network 16. Access node 34A may implement DHCP and act as what is referred to as a "DHCP relay" to relay this DHCP message 107A to DHCP server 28. DHCP server 28 typically reserves an IP address within its pool of IP addresses for use by advanced DPD 24B and leases this reserved IP address to advanced DPD 24B for use by advanced DPD 24B for a defined period of time. DHCP server 28 transmits a DHCP messages 107B offering the lease for this reserved IP address to advanced DPD 24B. Again, access node 34A may relay this message 107B to advanced DPD 24B. More information regarding DHCP generally and the details surrounding the mechanics of using DHCP to secure a lease for an IP address can be found in a Request for Comments (RFC) 2131, entitled "Dynamic Host Configuration Protocol," which is hereby incorporated by reference as if set forth in its entirety herein.

In response to securing the lease for an IP address, management module 104 configures its interface, e.g., interface 102A, to use this IP address. Management module 104 may then authenticate itself in accordance with RADIUS protocol 110 through communications 109 with the RADIUS server located in back office network 20. More information regarding the RADIUS protocol and the specifics of authentication of a device in accordance with the RADIUS protocol can be found in RFC 2865, entitled "Remote Authentication Dial In User Server (RADIUS)," which is hereby incorporated by reference as if set forth in its entirety herein.

In this example, it is assumed that access node 34A is configured to permit these communications 107A, 107B ("communications 107" or "messages 107") and 109 to reach back office network 20, but not any other communications. Access node 34A may implement a filter to filter all other communications until a device is transitioned to an authorized state. Access node 34A may snoop these communications 107, 109 to determine a current device state of advanced DPD 24B. In some instances, access node 34A may filter these communication 107, 109, or otherwise not permit these communications 107, 109 to reach back office network 20. In these instances, access node 34A may discover and authenticate advanced DPD 24B in a manner similar to that described above with respect to basic DPD 24A, e.g. using link OAM protocol 112. Once discovered and authenticated in this, what may be characterized as, more basic manner, advanced DPD 24B may request and secure a lease for a network-wide IP address via DHCP 108.

Regardless of how advanced DPD 24B is authenticated, upon securing a network-wide IP address, management module 104 of advanced DPD 24B may interface directly with provisioning system 30 using this network-wide IP address. Advanced DPD 24B communicates directly with provisioning system 30 by establishing an IP session directly with provisioning module 30 without requiring any bridging by provisioning bridge module 44 of access node 34A. The term "directly" is not used to suggest that these communications must travel directly from advanced DPD 24A to provisioning system 30 without traversing access node 34A. Management module 104 may interface with provisioning system 30 via this IP session in accordance with any number of provisioning protocols. In the example of FIG. 2B, management module 104 communicates with provisioning system 30 in accordance with a simple network management protocol (SNMP) 114 ("SNMP 114"). Management module 104 may generate and transmit SNMP messages 111 to and, likewise, receive SNMP messages 111 from provisioning system 30 in accordance with SNMP 114. More information concerning SNMP and how devices communicate with one another to retrieve provisioning data using SNMP can be found in RFC 1157, entitled "A Simple Network Management Protocol (SNMP)," the entire contents of which are hereby incorporated by reference as if set forth in this disclosure in their entirety.

From these SNMP messages 111, management module 104 may determine IP addresses of FTP or other types of servers that store service configuration data 88 and the latest version of the firmware executed by advanced DPD 24B. Using these IP addresses, management module 104 may retrieve this configuration data 88 and the firmware in accordance with SFTP 116. Management module 104 may retrieve configuration data 88 and forward this data to service manager module 106, which may apply this configuration data 106 to configure interfaces 102 so as to configure these interfaces 102 to deliver the one or more services to which the customer of customer network 18A has subscribed.

Management module 104 may also forward this service configuration data 88 or some portion thereof to access node 34A so as to inform access node 34A that these services are to be delivered to advanced DPD 24B. Management module 104 may forward service configuration data 88 using one or more link OAM messages 113 generated in accordance with link OAM protocol 112. Provisioning bridge module 44 may receive this service configuration data 88 via one or more of link OAM messages 113 and pass this service configuration data 88 to service manager module 48. Service manager module 48 may apply this configuration data to the one of interfaces 42 that couples access node 34A to link 22B, i.e., interface 42B in this example, so as to configure interface 42B to deliver the one or more services to which this customer has subscribed.

As noted above with respect to basic DPD 24A, advanced DPD 24B may also collect service status data 90. In contrast with basic DPD 24A, advanced DPD 24B may report this service status data 90 directly (meaning without involving provisioning bridge module 44) to provisioning system 30. In this example, access node 34A does not provide any bridge services and acts, instead, as an aggregator with respect to advanced DPD 24B in that access node 34A aggregates traffic from advanced DPD 24A with that of other ones of DPDs 24 for delivery upstream. Service manager module 48 of access node 34A may also store service configuration data 90 concerning the state and/or status of the services as monitored by access node 34A. Access node 34A may report this service status data 90 to provisioning system 30 or provisioning system 30 may pull this data from access node 34A.

As noted above, access node 34A may act as a provisioning bridge with respect to advanced DPDs 24B, such as when advanced DPD 24B does not implement the same version of one or more authentication or provisioning protocols as that implemented by provisioning system 30. In these instances, access node 34A may intercede, employing provisioning bridge module 44 to translate data communicated via these two different authenticating and/or provisioning programs employed by advanced DPD 24B and provisioning system 30. Access node 34A may invoke provisioning bridge module 44 to terminate these differing protocols on access node 34A, whereupon provisioning bridge module 44 may then translate the data and provide this translated data in a manner substantially similar to that described above with respect to the example of FIG. 2A.

While provisioning bridge module 44 is shown as being entirely implemented by access node 34A in the examples of FIGS. 2A, 2B, any other network device positioned intermediate to either provisioning system 30 and access node 34A or provisioning system 30 and DPDs 24 may implement various aspects of provisioning bridge module 44 in accordance with the techniques described in this disclosure. Thus, while described with respect to access node 34A, the techniques should not be limited strictly to the examples set forth in this disclosure in this respect. In some instances, for example, a device positioned intermediate to provisioning system 30 and access nodes 34 may implement the protocol translation aspects described above with respect to provisioning bridge module 44 of access node 34A, while access node 34A implements the various other aspect of provisioning bridge module 44 described above.

As noted above, the techniques may provide a single cohesive way by which to provisioning both access nodes 34 and DPDs 24. For example, access nodes 34 may each be configured as a single IP accessible end-point to be used for both service provisioning and access to service related information with respect to both basic and advanced ones of DPDs 24. While advanced ones of DPDs 24 may be capable of directly accessing back office network 20 in the manner described above with respect to the example of FIG. 2B, the administrator may only desire such direct communications in access network 16 when all of DPDs 24 are of the advanced variety.

Figure 3A:
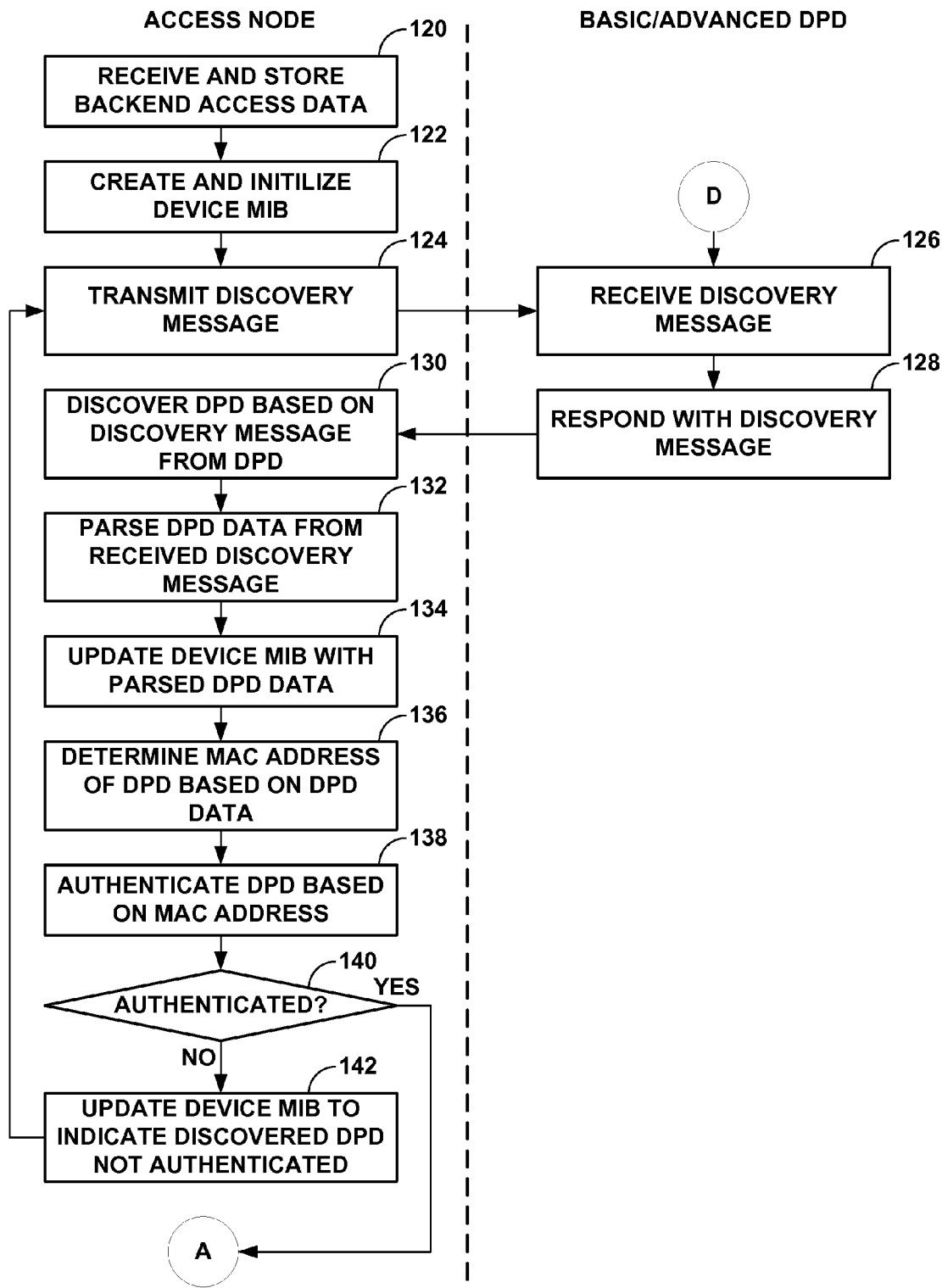
FIGS. 3A-3D are flowcharts illustrating example operation of an access network device and a demarcation point device in implementing various aspects of the techniques described in this disclosure.

FIGS. 3A-3D are flowcharts illustrating example operation of an access network device, such as access node 34A shown in the example of FIG. 2A, and a demarcation point device, such as basic DPD 24A, in implementing various aspects of the techniques described in this disclosure. Initially, upon powering-up, activating or otherwise starting access node 34A, an administrator configures access node 34A to act as a single point of IP presence for DPDs 24A-24M coupled to access node 34A via links 22A-22M. That is, the administrator interfaces with control unit 40 of access node 34A to specify backend access data 58, such that access node 34A may be able to communicate with provisioning system 30 on behalf of DPDs 24. Referring first to FIG. 3A, control unit 40 may invoke provisioning bridge module 44 to receive and store backend access data 58 (120). Also, upon power-up, control unit 40 may invoke device manager module 46 to create and initialize device MIB 62 in the manner described above (122).

Meanwhile, provisioning bridge module 44 may begin the discovery process. Provisioning bridge module 44 may have been previously configured or provisioned with operator preference list 82, which, as noted above, represents data that defines operator preference in terms of specifying a preferred one of discovery protocols 64, a preferred one of authentication protocols 80 and a preferred one of provisioning protocols 60 to be used on a per-interface or per-subscriber basis. If no preference is defined for a given interface, provisioning bridge module 44 may interface with device manager module 46 to determine a configured default discovery protocol for each interface stored to device MIB 62. In the example of FIG. 2A above, it was assumed that provisioning bridge module 44 determined that the one of discovery protocols 64 to use was the link OAM protocol of discovery protocols 64. However, any one of discovery protocols 64 commonly used to discovery DPDs 24 may be employed, such as the protocol set for in IEEE 802.1x standard. Regardless of the one of protocols 64 employed, provisioning bridge module issues what may be generally referred to as a "discovery message 66A" to basic DPD 24A (124).

Basic DPD 24A receives this discovery message 66A and, in response, generates and transmits its own discovery message 66B in accordance with the discovery protocol, which in this instance is shown by way of example to be link OAM protocol 68 (126, 128). Typically, both discovery messages 66A, 66B include data identifying access node 34A and basic DPD 24A, respectively, such as a MAC address, as well as, any other data that may be provided via proprietary or vendor-specific TLV fields (such as a vendor ID, a vendor OUI, etc.). In response to this discovery message 66B, provisioning bridge module 44 discovery basic DPD 24A (130). Provisioning bridge module 44 then parses what may be referred to as "DPD data" from discovery message 66B in accordance with the selected one of discovery protocols 64 (132). This DPD data includes the MAC address assigned to the one of interfaces 52 that communicated this message 66B, as well as, any other data stored to message 66B, including data specified in the TLV fields. Provisioning bridge module 44 may interface with device manager module 46 to update an entry in device MIB 62 associated with the parsed MAC address of DPD data to store the remaining DPD data (134).

Provisioning bridge module 44 may then determine the MAC address of basic DPD 24A based on the DPD data and authenticate basic DPD 24A in accordance with one of authentication protocols 80 based on the MAC address (136, 138). Again, as described above, provisioning bridge module 44 may select which of authentication protocols 80 to employ to authenticate basic DPD 24A based on operator preference list 82 or, if not preference is specified by operator preference list 82, device MIB 62. If not successfully authenticated ("NO" 140), provisioning bridge module 44 interfaces with device manager module 46 to update device MIB 62 to indicate that basic DPD 24A was not successfully authenticated (142). Provisioning bridge module 44 may update device MIB 62 to note the number of successive unsuccessful authentication attempts. Moreover, in response to updating device MIB 62, provisioning bridge module 44 may report this unsuccessful authentication attempt to provisioning system 30 through a connection established in accordance with backend access data 58.

Provisioning bridge module 44 may then continue to discovery and authenticate DPDs 24A-24M in this manner. Until such time that basic DPD 24A can be authenticated (which usually requires the customer to call the service provider to remedy the authentication issue), basic DPD 24A may continually attempt to access service provider network 16 via access node 34A. Commonly, after a configurable or set number of unsuccessful attempts to authenticate device DPD 24A, provisioning bridge module 44 may report this authentication issue to provisioning system 30 through a connection with provisioning system 30 specified by backend access data 58.

Figure 3B:
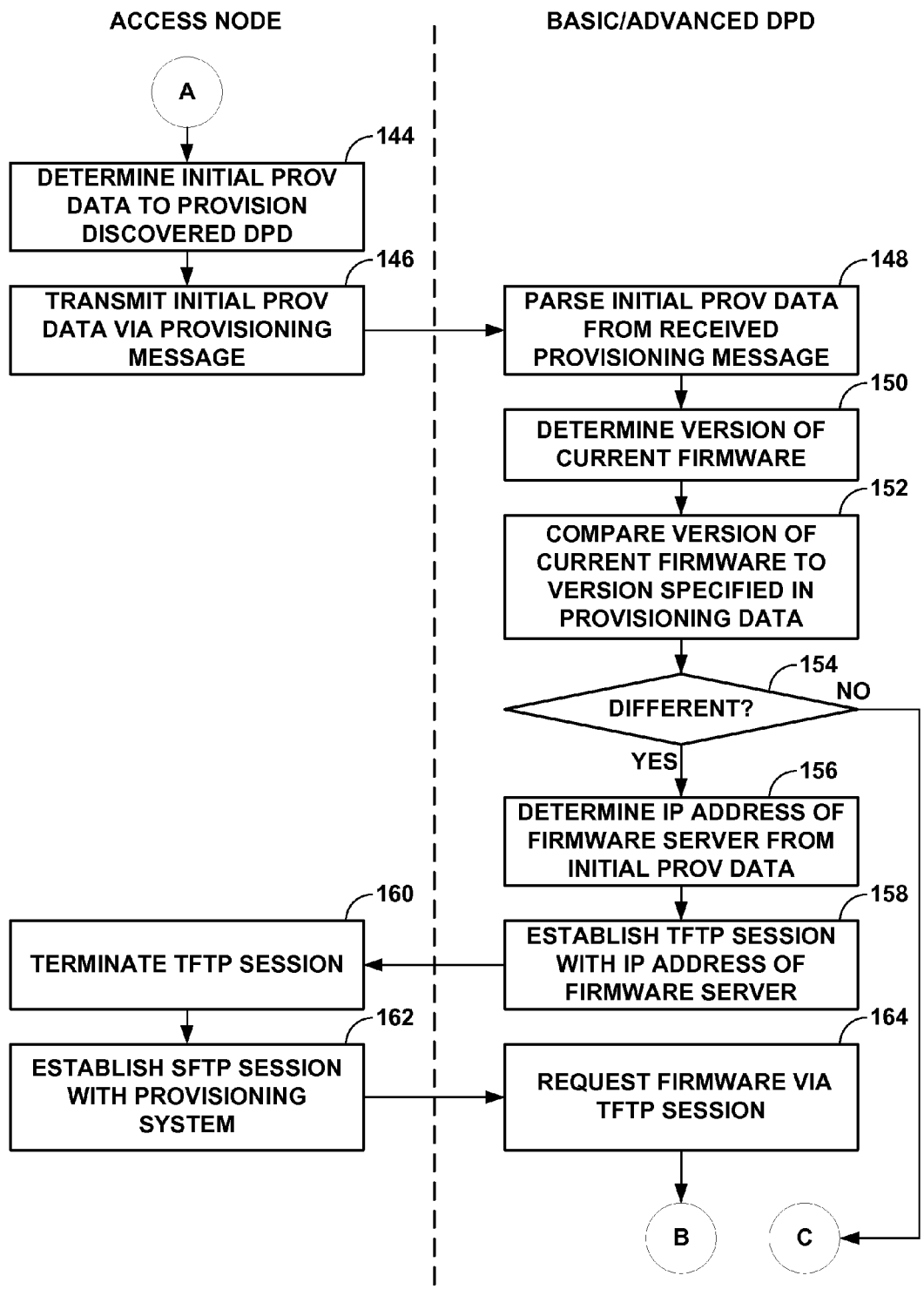

Assuming for purposes of illustration that DPD 24A was successfully authenticated ("YES" 140), provisioning bridge module 44 determines initial provisioning data ("initial prov. data") to use when provisioning discovered basic DPD 24A (referring to FIG. 3B, 144). Provisioning bridge module 44 then transmits initial provisioning data via a provisioning message formed in accordance with one of provisioning protocols 80, as described above (146). Basic DPD 24A receives this provisioning message and invokes management module 54 in response to receiving this provisioning message. Management module 54 invokes its provisioning protocol, link OAM protocol 68, to parse the initial provisioning data from this received provisioning link OAM protocol message. This initial provisioning data may identify a version of firmware that provisioning system 30 requires each of DPDs 24 to execute. Management module 54 may determine the version of the firmware it is currently executing and compare the version of the currently executed firmware to the version of the firmware specified by the initial provisioning data (150, 152).

If the versions are different ("YES" 154), management module 54 determines an IP address of a server that stores the required version of the firmware based on the initial provisioning data (156). That is, the initial provisioning data may define this IP address for what may be referred to as the "firmware server" as well as an IP address used to access what may be referred to as a "configuration server." In the example of FIGS. 3A-3D, both of these IP addresses may be assigned to access node 34A. In any event, upon determining this IP address, management module 54 establishes a TFTP session with the IP address assigned to access node 34A, which invokes provisioning bridge module 44 to terminate this TFTP session in accordance with a TFTP one of provisioning protocols 80 (158, 160). In response to establishing this TFTP session, provisioning bridge module 44 establishes an SFTP session with provisioning system 30 in accordance with the SFTP one of provisioning protocols 80 (162). Provisioning bridge module 44 determines that it should use SFTP by performing a lookup in backend access data 58 to identify which protocol should be used to retrieve firmware.

Figure 3C:
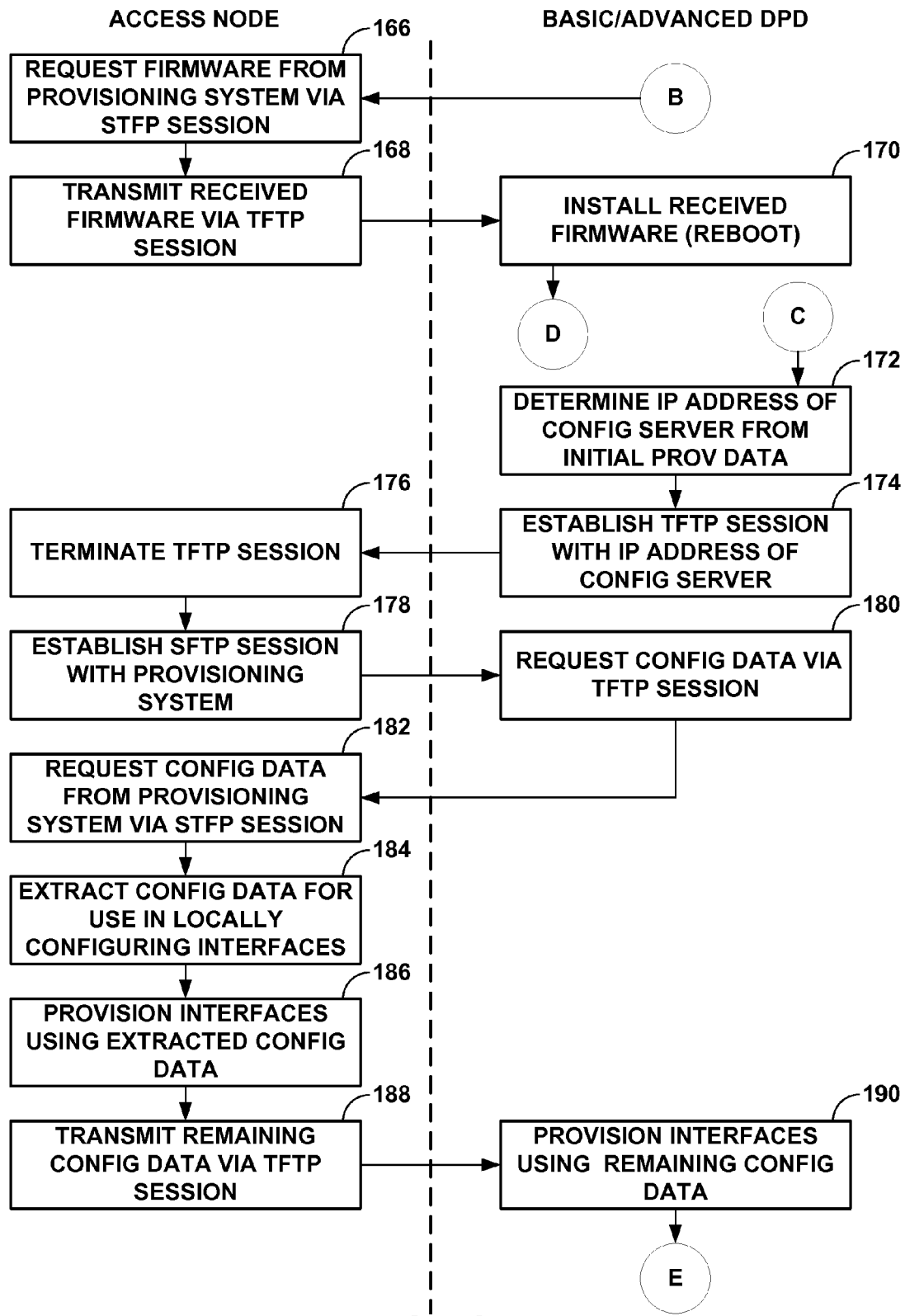

Meanwhile, management module 54 of basic DPD 24A requests the current version of the firmware via the TFTP session (164). Referring to FIG. 3C, provisioning bridge module 44 of access node 34A receives this request for the firmware via the TFTP session and, in response to receiving this request, requests the firmware from provisioning system 30 via the SFTP session (166). Upon receiving this firmware from provisioning system 30 via the SFTP session, provisioning bridge module 44 then transmits the received firmware to DPD 34A via the TFTP session (168). Management module 54 of basic DPD 24A receives and installs this firmware, which normally requires a reboot or power cycling of basic DPD 24A to fully install (170).

Upon rebooting or otherwise activating after powering down, basic DPD 24A is once again discovered, authenticated and provisioned with initial provisioning data in the manner described above (FIG. 3A: 126-140; FIG. 3B: 144-152). In this instance, however, when comparing the currently installed version of the firmware to that provided via the initial provisioning data, management module 54 determines that the versions are not different ("NO" 154). In response to this determination (continuing to FIG. 3C), management module 54 determines an IP address of the configuration server from the initial provisioning data (172). Management module 54 then establishes a TFTP session with this IP address of the configuration server in accordance with TFTP 84, where again management module 54 may determine to use this TFTP protocol by parsing initial provisioning data to determine the configuration server protocol, as shown above (174). Once again, provisioning bridge module 44 of access node 34A may terminate this TFTP session and establish an SFTP session with provisioning system 30 in accordance with the SFTP one of provisioning protocols 80 (176, 178). Again, provisioning bridge module 44 may be configured to use the SFTP one of provisioning protocols 80 by way of backend access data 58.

Meanwhile, management module 54 issues a request for configuration data via the TFTP session (180). In response to receiving this request, provisioning bridge module 44 of access node 34A requests the configuration data from provision system 30 via the SFTP session (182). Provisioning bridge module 44 of access node 34A may receive this configuration data and pass this configuration data to service manager module 48. Service manager module 48 may parse or otherwise extract configuration data for use by service manager module 48 in locally provisioning one of interfaces 42 to provide the subscribed-to services to basic DPD 24A in the manner described above (184). Service manager module 48 may then pass the remaining configuration data back to provisioning bridge module 44, while also provisioning one or more of interfaces 42 using the extracted configuration data (186). Provisioning bridge module 44 then transmits the remaining configuration data via the TFTP session to basic DPD 24A (188). Management module 54 of basic DPD 24A receives this remaining configuration data and passes it to service manager module 56. Service manager module 56 may then configure or provision one or more of interfaces 52 to provide the subscribed-to services using the remaining configuration data (190).

In this manner, the techniques enable access node 34A to implement a provisioning bridge module 44 that is capable of providing a network wide IP presence such that provisioning system 30 may be used to remotely configure basic DPD 24A that may not support this type of network wide IP presence. Moreover, the techniques enable this provisioning bridge module 44 to "bridge" a protocol gap considering that provisioning system 30 may require support of SFTP while basic DPD 24A may only support the much simpler TFTP. Furthermore, the techniques facilitate security in that access node 34A may interface with provisioning system 30 using SFTP to isolate the access network from the back office network to prevent potential malicious users from gaining access to the back office network.

Figure 3D:
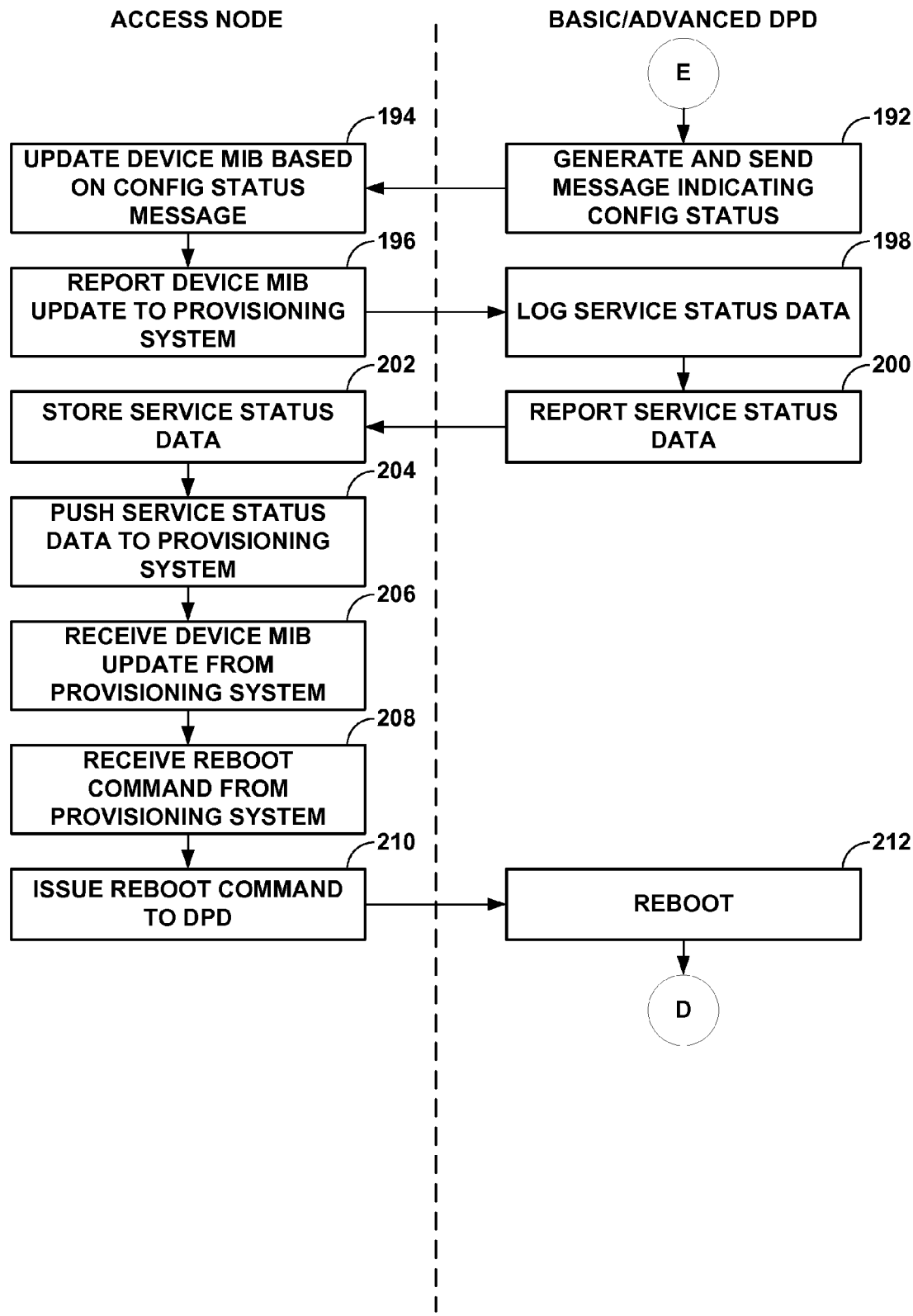

Referring to FIG. 3D, service manager module 56 of access node 34A may generate a message indicating the configuration status of basic DPD 24A (e.g., that the basic DPD 24A was successfully provisioned), where upon management module 54 may send this message via a link OAM message formed in accordance with link OAM protocol 68 to access node 34A (192). Provisioning bridge module 44 receives this status message and interface with device manager module 46 to update the entry associated with basic DPD 24A in device MIB 62 based on this configuration status message (194). In this example, it is assumed that device MIB 62 is configured to "push" status updates to provisioning system 30. Thus, in response to updating device MIB 62, device manager module 46 interfaces with provisioning bridge module 44 so as to cause provisioning bridge module 44 to report the change to device MIB 62 to provisioning system 30.

Meanwhile, service manager module 56 may log service status data 90 that defines a status of the various subscribed-to services (198). Service manager module 56 may be configured to periodically report this service status data 198. To report this data, service manager module 56 may interface with management module 54, whereupon management module 54 may establish a TFTP session with the IP address defined in the initial provisioning data. Once established, management module 54 may report this service status data 90 (200).

Provisioning bridge module 44 of access node 34A may once again terminate this TFTP session. Provisioning bridge module 44 receives this service status data 90 via the TFTP session and forwards this data 90 to service manager module 48. Service manager module 48 may store this service status data 90 (202). Provisioning bridge module 44 may also establish an SFTP session with provisioning system 30 to push this service status data 90 to provisioning system 30, where again provisioning bridge module 44 may determine to use SFTP based on backend access data 48 (204). In this manner, the techniques may facilitate the reporting of data from DPDs 24 to provisioning system 30 when some or all of these DPDs 24 do not support a network-wide IP presence.

In some instances, provisioning system 30 may update the initial configuration data to specify that a new version of firmware is available or that an IP address assigned to the firmware or configuration server has changed. In these instances, provisioning system 30 may establish a session with access node 34A, interfacing with device manager module 46 via provisioning bridge module 44 (or directly in some instances) to update device MIB 62 to change the initial provisioning data. Device manager module 46 may receive these device MIB updates from provisioning system 30 and update device MIB 62 accordingly (206).

In other instances, provisioning system 30 may update the configuration data, for example, to reflect changes to services to which the customer has subscribed. These changes may not impact device MIB 62 and thus provisioning system 30 may not always interface with device MIB 62 prior to affecting a change in service. Instead, most DPDs 24 are configured to always download the configuration data when powering on. Regardless of whether updating device MIB 62 or not, provisioning system 30 may issue a reboot command to cause basic DPD 24A to reboot. Provisioning bridge module 44 may receive this reboot command via one of provisioning protocols 80 and issue this reboot command to DPD 24A via a link OAM protocol message (208, 210). DPD 24A will then reboot (212) and perform the discovery, authentication and provisioning processes described above to retrieve either or both of the updated device MIB data or the updated configuration data (120-212).

Figure 4A:
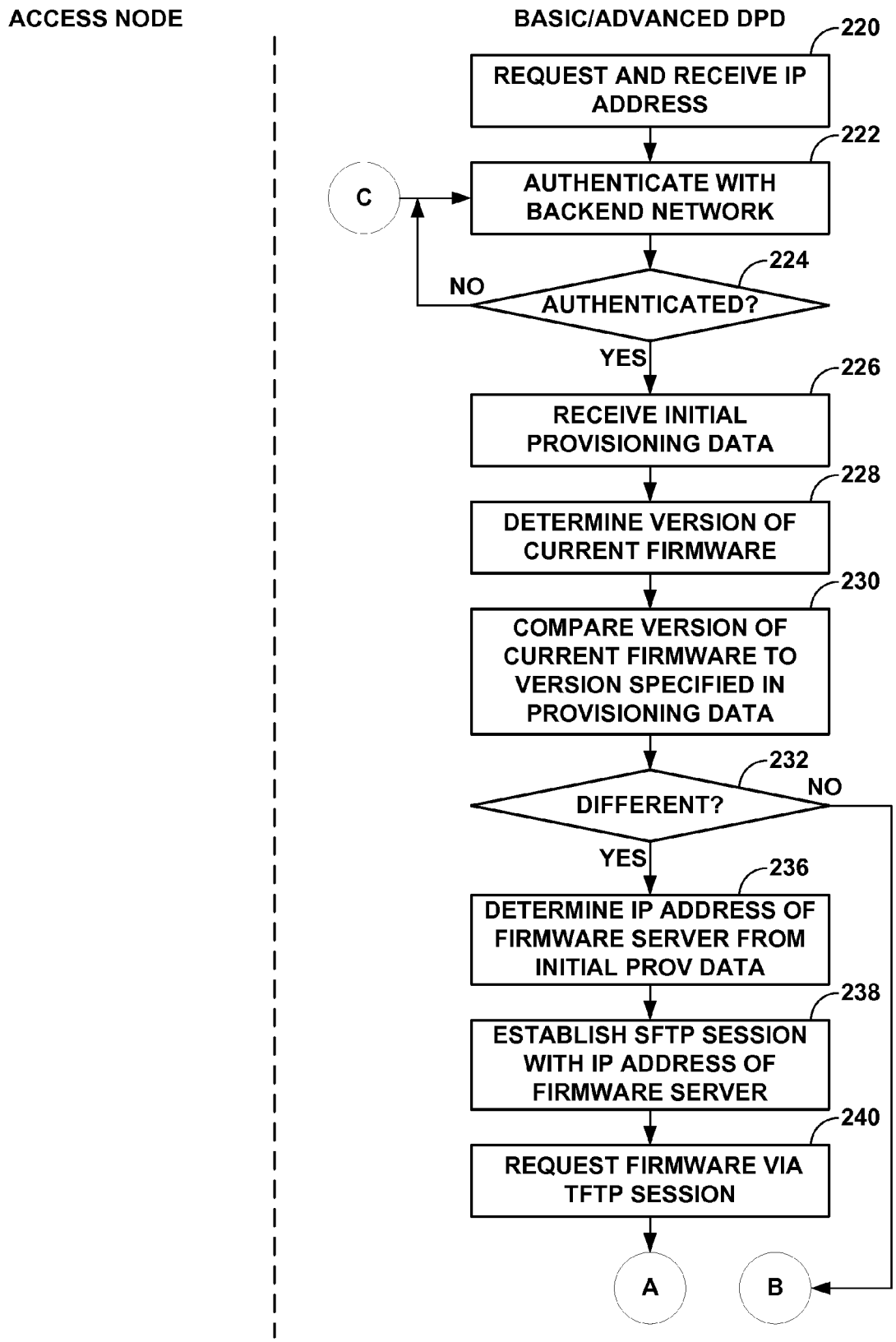
FIGS. 4A-4C are flowcharts illustrating example operation of an access network device and a demarcation point device in implementing various other aspects of the techniques described in this disclosure.
Figure 4B:
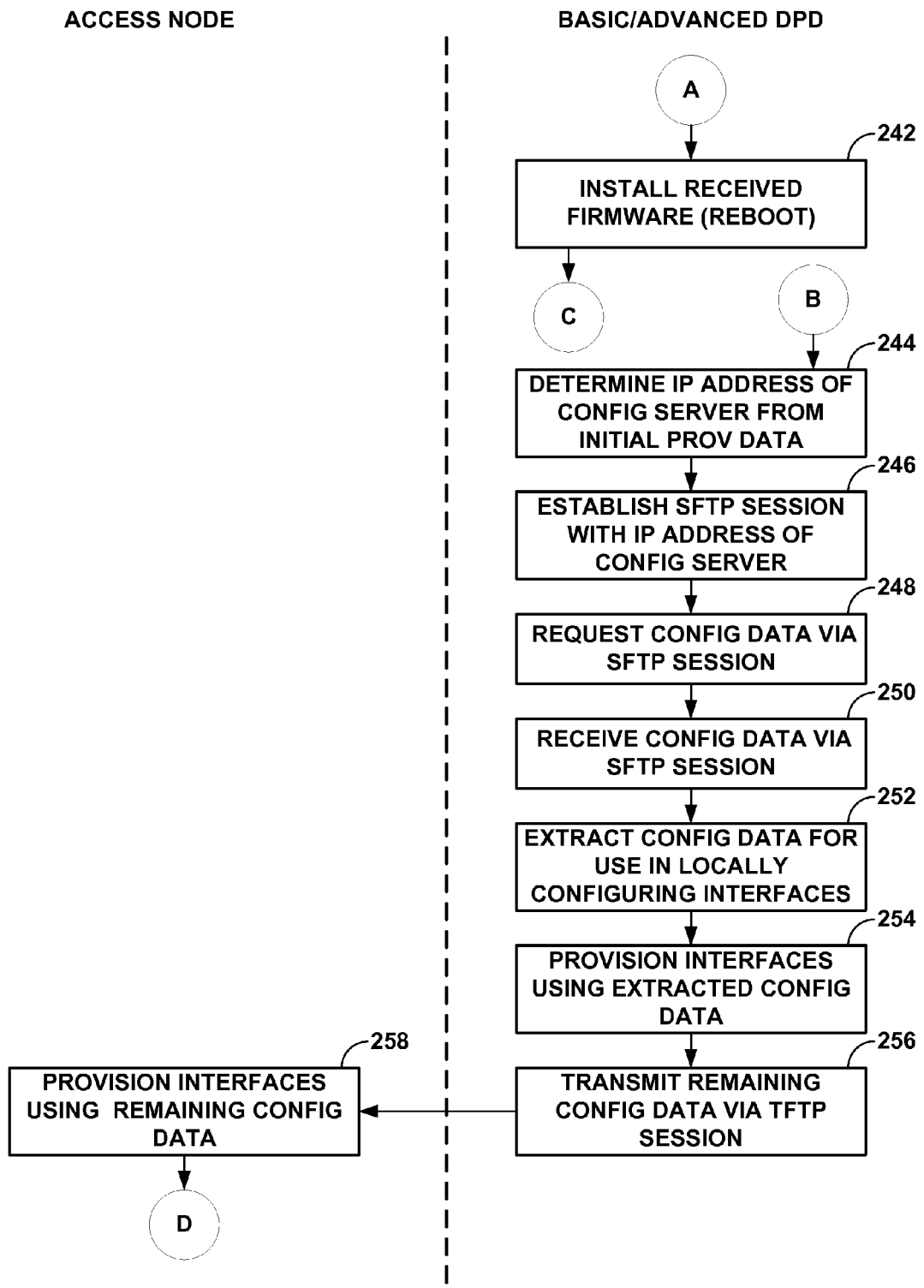
Figure 4C:
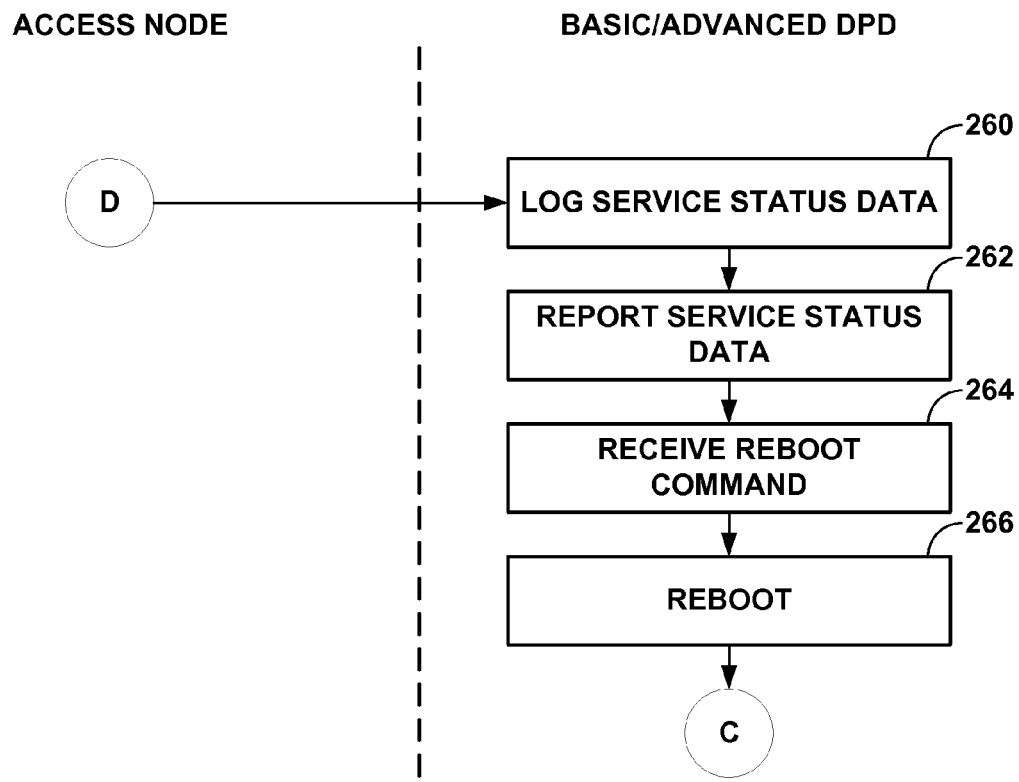

FIGS. 4A-4C are flowcharts illustrating example operation of an access network device, such as access node 34A shown in the example of FIG. 2B, and a demarcation point device, such as advanced DPD 24B, in implementing various aspects of the techniques described in this disclosure. Typically, upon powering-up, starting or otherwise activating advanced DPD 24B, control unit 100 of advanced DPD 24B invokes management module 104. Once invoked, management module 104 issues a DHCP message 107A in accordance with DHCP 108 requesting that a network-wide IP address (as opposed to a link-local IP address) be assigned to advanced DPD 24B for use in accessing service provider network 16. DHCP server 28 located in back office network 20 transmits a DHCP messages 107B offering the lease for this reserved IP address to advanced DPD 24B. Again, access node 34A may relay this message 107B to advanced DPD 24B. In response to securing the lease for an IP address, management module 104 configures its interface, e.g., interface 102A, to use this IP address. In this manner, advanced DPD 24B requests and receives an IP address providing this DPD 24B with a network-wide IP presence (220).

Management module 104 may then authenticate itself in accordance with RADIUS protocol 110 through communications 109 with the RADIUS server located in back office network 20 (222). If not authenticated ("NO" 224), management module 104 may repeatedly attempt to authenticate itself until blocked by the RADIUS server. As noted above, authentication errors are typically resolved by a customer call and an update to RADIUS server. Assuming authentication is successful ("YES" 224), management module 104 of advanced DPD 24B may interface directly with provisioning system 30 using this network-wide IP address. Advanced DPD 24B communicates directly with provisioning system 30 by establishing an IP session directly with provisioning module 30 without requiring any bridging by provisioning bridge module 44 of access node 34A.

In the example of FIG. 2B, management module 104 communicates with provisioning system 30 in accordance with a simple network management protocol (SNMP) 114 ("SNMP 114"). Management module 104 may generate and transmit SNMP messages 111 to and, likewise, receive SNMP messages 111 from provisioning system 30 in accordance with SNMP 114. These messages 111 may specify initial provisioning data, and in this manner, management module 104 may receive the initial provisioning data (226). From these SNMP messages 111, management module 104 may determine IP addresses of FTP or other types of servers that store service configuration data 88 and the latest version of the firmware executed by advanced DPD 24B. Using these IP addresses, management module 104 may retrieve this configuration data 88 and the firmware in accordance with SFTP 116 in a manner similar to that described above with respect to DPD 24A, except that DPD 24B interfaces directly with provisioning system 30 to retrieve this data.

For example, management module 104 may determine a current version of firmware executed by advanced DPD 24B (228) and compare this current version to the version specified in the initial provisioning data (230). If different ("YES" 232), management module 104 may determine an IP address of the firmware server from the initial provisioning data, establish an SFTP session with the IP address of the firmware server (located in back office network 20) and directly request this firmware via the SFTP session with the firmware server (236-240). Referring to FIG. 4B, management module 104 may receive and install this firmware, which typically requires a reboot (242). Once rebooted, management module 104 repeats the process described above (222-230), except that this time the versions of the firmware are likely to be the same ("NO" 232). As a result, management module 104 does not attempt to update its firmware but instead proceeds to determine an IP address of the configuration server from the initial provisioning data, establish an SFTP session with this configuration server and requests the configuration data via the SFTP session (244-248). In response to this request, management module 104 receives the configuration data via the SFTP session (250).

As noted above, this configuration data may define configuration data for both DPD 24A and access node 34A. Management module 104 may pass this configuration data to service manager module 106. Service management module 106 may extract service configuration data 88 that applies to advanced DPD 24B, applying this service configuration data 88 to one or more of interfaces 102 to provision these interfaces 102 to provide the subscribed-to services (252, 254). Service management module 106 passes the remaining configuration data to management module 104, which proceeds to transmit this remaining configuration data to access node 34A (256). Service manager module 48 of access node 34A receives this remaining configuration data and stores it as service configuration data 86. Service manager module 48 then applies service configuration data 86 to one or more of interfaces 42 to provision these interfaces 42 to provide the subscribed-to services to advanced DPD 24B (258).

Once provisioned, access node 34A may permit the delivery of the subscribed-to services to advanced DPD 24B. Advanced DPD 24B may invoke service manager module 106 to log service status data 90, which service manager module 106 may periodically report via management module 104 directly to provisioning system 30 (260, 262). In some instances, provisioning module 30 may issue a reboot command so as to cause advanced DPD 24B to reboot, often to affect some change with respect to accessing back office network 20, the state of advanced DDP 24B (e.g., to changing the firmware) or the delivery of the subscribed-to services (e.g., by providing new configuration data). Management module 104 may receive this reboot command and reboot with similar results to those described above (264, 266).

The techniques described herein may be implemented in hardware, firmware, or any combination thereof. The hardware may, in some instances, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various examples have been described. These and other examples are within the scope of the following claims.

The invention claimed is:

1. A method comprising:
receiving, with a demarcation point device, a layer three (L3) address for use in communicating within a service provider network, wherein the L3 address is unique within the service provider network, wherein the demarcation point device terminates an access network of the service provider network at a customer network and transfers data between a first physical communication medium used within the access network to communicate the data and a second physical communication medium used within the customer network to communicate the data, and wherein the access network implements an Ethernet protocol to provide layer two (L2) network connectivity between the service provider network and the customer network;
requesting authentication with the demarcation point device directly from a provisioning system of the service provider network using L3 communications that include the L3 address;
upon being successfully authenticated in response to the authentication request, requesting configuration data with the demarcation point device directly from the provisioning system, wherein the configuration data includes first data to configure the demarcation point device and second data to configure an access node of the access network that is positioned between the demarcation point device and the provisioning system;
provisioning one or more interfaces of the demarcation point device using the first data to provide one or more services to the customer network; and
transmitting to the access node the second data for configuring the access node.

2. The method of claim 1, wherein requesting the configuration data comprises:
establishing a L3 communication session with a provisioning system located in a back office network through the access node of the access network such that the demarcation point device terminates one end of the L3 communication session and the provisioning system terminates the other end of the L3 communication session; and
requesting the configuration data via the established L3 communication session directly from the provisioning system located in the back office network.

3. The method of claim 2, wherein establishing the L3 communication session comprises establishing the L3 communication session in accordance with a secure file transfer protocol (SFTP).

4. The method of claim 1, wherein requesting the authentication with the demarcation point comprises requesting the authentication with the demarcation point in accordance with a remote authentication dial in user service (RADIUS) protocol.

5. The method of claim 1,
wherein the access network includes at least one optical fiber link that connects the access node to the demarcation point device, and
wherein the access node comprises an optical line terminal (OLT), and
wherein the demarcation point device comprises an optical network terminal (ONT).

6. A demarcation point device that terminates an access network of a service provider network at a customer network, the demarcation point device comprising:
one or more interfaces; and
a control unit configured to receive a layer three (L3) address for use in communicating within the service provider network, wherein the L3 address is unique within the service provider network, request authentication directly from a back office network of the service provider network using L3 communication that includes the L3 address, upon being successfully authenticated in response to the authentication request, request configuration data directly from the provisioning system, wherein the configuration data includes first data to configure the demarcation point device and second data to configure an access node of the access network that is positioned between the demarcation point device and the provisioning system, and provision the one or more interfaces of the demarcation point device using the first data to provide one or more services to the customer network,
wherein the one or more interfaces transmit the second data of the configuration data to the access node.

7. The demarcation point device of claim 6, wherein the control unit further establishes a L3 communication session with a provisioning system located in the back office network through the access node of the access network such that the demarcation point device terminates one end of the L3 communication session and the provisioning system terminates the other end of the L3 communication session and requests the configuration data via the established L3 communication session directly from the provisioning system located in the back office network.

8. The demarcation point device of claim 6, wherein the control unit establishes the L3 communication session in accordance with a secure file transfer protocol (SFTP).

9. The demarcation point device of claim 6, wherein the control unit is configured to request the authentication with the demarcation point in accordance with a remote authentication dial in user service (RADIUS) protocol.

10. The demarcation point device of claim 6,
wherein the access network includes at least one optical fiber link that connects an access node to the demarcation point device, and
wherein the access node comprises an optical line terminal (OLT), and wherein the demarcation point device comprises an optical network terminal (ONT).

11. A network system comprising:
a customer network; and
a service provider network that provides one or more services,
wherein the service provider network includes:
a provisioning system; and
an access network comprising an access node and a demarcation point device,
wherein the access network implements an Ethernet protocol to provide layer two (L2) network connectivity between the service provider network and the customer network,
wherein the demarcation point device terminates the access network of the service provider network at the customer network and transfers data between a first physical communication medium used within the access network to communicate the data and a second physical communication medium used within the customer network to communicate the data,
wherein the access node is positioned intermediate to the provisioning system and the demarcation point device, and
wherein the demarcation point device comprises:
one or more interfaces; and
a control unit that receives a layer three (L3) address for use in communicating within the service provider network, wherein the L3 address is unique within the service provider network, requests authentication directly from the back office network of the service provider network using L3 communications that include the L3 address, upon being successfully authenticated in response to the authentication request, requests configuration data with the demarcation point device directly from the back office network, wherein the configuration data includes first data to configure the demarcation point device and second data to configure the access node of the access network, and provisions the one or more interfaces of the demarcation point device using the first data to provide one or more services to the customer network,
wherein the one or more interfaces transmit to the access node the second data of the configuration data for configuring the access node.

12. The network system of claim 11, wherein the control unit is further configured to establish a L3 communication session with a provisioning system located in the back office network through the access node of the access network such that the demarcation point device terminates one end of the L3 communication session and the provisioning system terminates the other end of the L3 communication session and requests the configuration data via the established L3 communication session directly from the provisioning system located in the back office network.

13. The network system of claim 12, wherein the control unit establishes the L3 communication session in accordance with a secure file transfer protocol (SFTP).

14. The network system of claim 11, wherein the control unit is configured to request the authentication with the demarcation point in accordance with a remote authentication dial in user service (RADIUS) protocol.

15. The network system of claim 11,
wherein the access network includes at least one optical fiber link that connects an access node to the demarcation point device, and wherein the access node comprises an optical line terminal (OLT), and
wherein the demarcation point device comprises an optical network terminal (ONT).

16. A non-transitory computer readable medium comprising instructions that, when executed, cause one or more processors to:
receive, with a demarcation point device, a layer three (L3) address for use in communicating within a service provider network, wherein the L3 address is unique within the service provider network, wherein the demarcation point device terminates an access network of the service provider network at a customer network and transfers data between a first physical communication medium used within the access network to communicate the data and a second physical communication medium used within the customer network to communicate the data, wherein the access network implements an Ethernet protocol to provide layer two (L2) network connectivity between the service provider network and the customer network;
request authentication with the demarcation point device directly from a provisioning system of the service provider network using L3 communications that include the L3 address;
upon being successfully authenticated in response to the authentication request, request configuration data with the demarcation point device directly from the provisioning system, wherein the configuration data includes first data to configure the demarcation point device and second data to configure an access node of the access network that is positioned between the demarcation point device and the provisioning system;
using the first data, provisions one or more interfaces of the demarcation point device to provide one or more services to the customer network; and
transmit the second data of the configuration data to the access node.

17. The non-transitory computer readable medium of claim 16, further storing instructions that when executed cause the one or more processors to:
establish a L3 communication session with a provisioning system located in the back office network through the access node of the access network such that the demarcation point device terminates one end of the L3 communication session and the provisioning system terminates the other end of the L3 communication session; and
request the configuration data via the established L3 communication session directly from the provisioning system located in the back office network.

18. The non-transitory computer readable medium of claim 17, further storing instructions that when executed cause the one or more processors to establish the L3 communication session in accordance with a secure file transfer protocol (SFTP).

19. The non-transitory computer readable medium of claim 16, further storing instructions that when executed cause the one or more processors to request the authentication with the demarcation point in accordance with a remote authentication dial in user service (RADIUS) protocol.

20. The non-transitory computer readable medium of claim 16,
wherein the access network includes at least one optical fiber link that connects the access node to the demarcation point device, and wherein the access node comprises an optical line terminal (OLT), and wherein the demarcation point device comprises an optical network terminal (ONT).

\* \* \* \* \*